United States Patent
King et al.

(10) Patent No.: US 7,334,733 B2
(45) Date of Patent: Feb. 26, 2008

(54) DATA ACCESS DEVICE USING ROTATIONAL HEAD TO ACCESS DATA STORED IN DATA STRIPS AND DATA ARC SEGMENTS OR DATA CIRCLES

(75) Inventors: Francis K. King, San Jose, CA (US); Jeffrey Liu, San Jose, CA (US)

(73) Assignee: Dcard, Inc., Milpitas, CA (US)

( * ) Notice: Subject to any disclaimer, the term of this patent is extended or adjusted under 35 U.S.C. 154(b) by 608 days.

(21) Appl. No.: 10/424,341

(22) Filed: Apr. 28, 2003

(65) Prior Publication Data

US 2004/0076105 A1    Apr. 22, 2004

Related U.S. Application Data

(60) Provisional application No. 60/419,293, filed on Oct. 16, 2002.

(51) Int. Cl.
*G06K 19/00*    (2006.01)
*G06K 7/10*     (2006.01)
*G06K 7/14*     (2006.01)
*G06K 5/00*     (2006.01)
*G06K 19/06*    (2006.01)

(52) U.S. Cl. ............... 235/487; 235/454; 235/380; 235/492

(58) Field of Classification Search ........... 235/487, 235/492, 454, 380; 369/97; 283/82; 360/2; 720/745
See application file for complete search history.

(56) References Cited

U.S. PATENT DOCUMENTS

| | | | | |
|---|---|---|---|---|
| 4,323,933 A | * | 4/1982 | Fichter | 346/74.3 |
| 4,512,006 A | * | 4/1985 | Murakami et al. | 369/59.25 |
| 4,592,042 A | * | 5/1986 | Lemelson et al. | 720/745 |
| 4,868,373 A | * | 9/1989 | Opheij et al. | 235/380 |
| 4,916,687 A | * | 4/1990 | Endo | 369/111 |
| 4,950,877 A | * | 8/1990 | Kurihara et al. | 235/480 |
| 4,979,159 A | * | 12/1990 | Tsuruoka et al. | 369/53.24 |
| 5,045,676 A | * | 9/1991 | Kime | 235/487 |
| 5,059,774 A | * | 10/1991 | Kubo et al. | 235/454 |

(Continued)

FOREIGN PATENT DOCUMENTS

JP    53144704 A  *  12/1978

(Continued)

*Primary Examiner*—Daniel Walsh
(74) *Attorney, Agent, or Firm*—Bo-In Lin

(57) ABSTRACT

This invention discloses a data card that has a plurality of data arcs and also a linear data track, e.g., a magnetic or optical data strip, disposed on a flat data storage medium. The data card may be employed as a credit card or ID card with conventional magnetic strip for storing conventional data operable with conventional card reader. The data arc segments may be employed to store additional information for authenticating cardholder's personal biometrics information to prevent credit card or ID card frauds. In one embodiment, the data tracks further include at least one full circle data track provided with data for conveniently determining a central position of the data card in a data drive system. The data stored in the full circle data track can also be conveniently used to obtain a measurement of average signal amplitude to calibrate the signal measurements from the data card. The dynamic head loading and unloading configuration and a card insertion lock.

28 Claims, 31 Drawing Sheets

U.S. PATENT DOCUMENTS

| | | | | |
|---|---|---|---|---|
| 5,257,249 A * | 10/1993 | Rokutan | ................... | 369/44.11 |
| 5,274,617 A * | 12/1993 | Terashima et al. | ........ | 369/53.24 |
| 5,559,885 A * | 9/1996 | Drexler et al. | ............... | 235/380 |
| 5,617,391 A * | 4/1997 | Ono et al. | ................ | 369/44.18 |
| 5,640,383 A * | 6/1997 | Kamoto et al. | .......... | 369/275.3 |
| 5,748,600 A * | 5/1998 | Sugano et al. | .......... | 369/44.18 |
| 5,763,868 A * | 6/1998 | Kubota et al. | .............. | 235/487 |
| 5,777,307 A * | 7/1998 | Yamazaki | ................... | 235/454 |
| 5,802,025 A * | 9/1998 | Suni | ........................ | 369/44.41 |
| 5,894,460 A * | 4/1999 | Yanagawa et al. | ........ | 369/13.37 |
| 5,895,909 A * | 4/1999 | Yoshida | ...................... | 235/487 |
| 6,016,959 A * | 1/2000 | Kamo et al. | ................ | 235/449 |
| 6,021,030 A * | 2/2000 | Weinberger et al. | ........ | 360/133 |
| 6,484,940 B1 * | 11/2002 | Dilday et al. | ............... | 235/454 |
| 6,510,124 B1 * | 1/2003 | Wood | ........................... | 369/273 |
| 6,513,709 B1 * | 2/2003 | Hansen | ....................... | 235/380 |
| 6,550,678 B1 * | 4/2003 | Ong et al. | ................... | 235/454 |
| 6,561,420 B1 * | 5/2003 | Tsai et al. | .................... | 235/449 |
| 6,597,653 B1 * | 7/2003 | Burnett | ....................... | 369/273 |
| 6,760,280 B1 * | 7/2004 | Schoppe | ...................... | 369/14 |
| 6,857,575 B2 * | 2/2005 | Mathias et al. | ............. | 235/487 |
| 6,969,006 B1 * | 11/2005 | Smith, Sr. | ................... | 235/487 |
| 7,185,814 B2 * | 3/2007 | Liu et al. | ..................... | 235/454 |
| 2002/0006103 A1 * | 1/2002 | Duroj | .......................... | 369/273 |
| 2002/0020740 A1 * | 2/2002 | Aarons | ......................... | 235/380 |
| 2002/0027837 A1 * | 3/2002 | Weber | .......................... | 369/14 |
| 2002/0136124 A1 * | 9/2002 | Pirot et al. | ................ | 369/47.54 |
| 2002/0153421 A1 * | 10/2002 | Haddock | ..................... | 235/454 |
| 2003/0004876 A1 * | 1/2003 | Jacobson | ..................... | 705/41 |
| 2003/0024995 A1 * | 2/2003 | Conner et al. | ................ | 235/492 |
| 2003/0111539 A1 * | 6/2003 | Cheung | ....................... | 235/487 |
| 2003/0136846 A1 * | 7/2003 | Higgins et al. | ............. | 235/487 |
| 2004/0041711 A1 * | 3/2004 | Loewidt | ................ | 340/825.52 |
| 2004/0159707 A1 * | 8/2004 | Liu et al. | ..................... | 235/487 |
| 2005/0254797 A1 * | 11/2005 | Nijboer et al. | .............. | 386/125 |
| 2006/0031767 A1 * | 2/2006 | Nishizawa | ...................... | 715/723 |
| 2006/0198281 A1 * | 9/2006 | Corley et al. | ............... | 369/273 |

FOREIGN PATENT DOCUMENTS

JP            03230383 A    * 10/1991

* cited by examiner

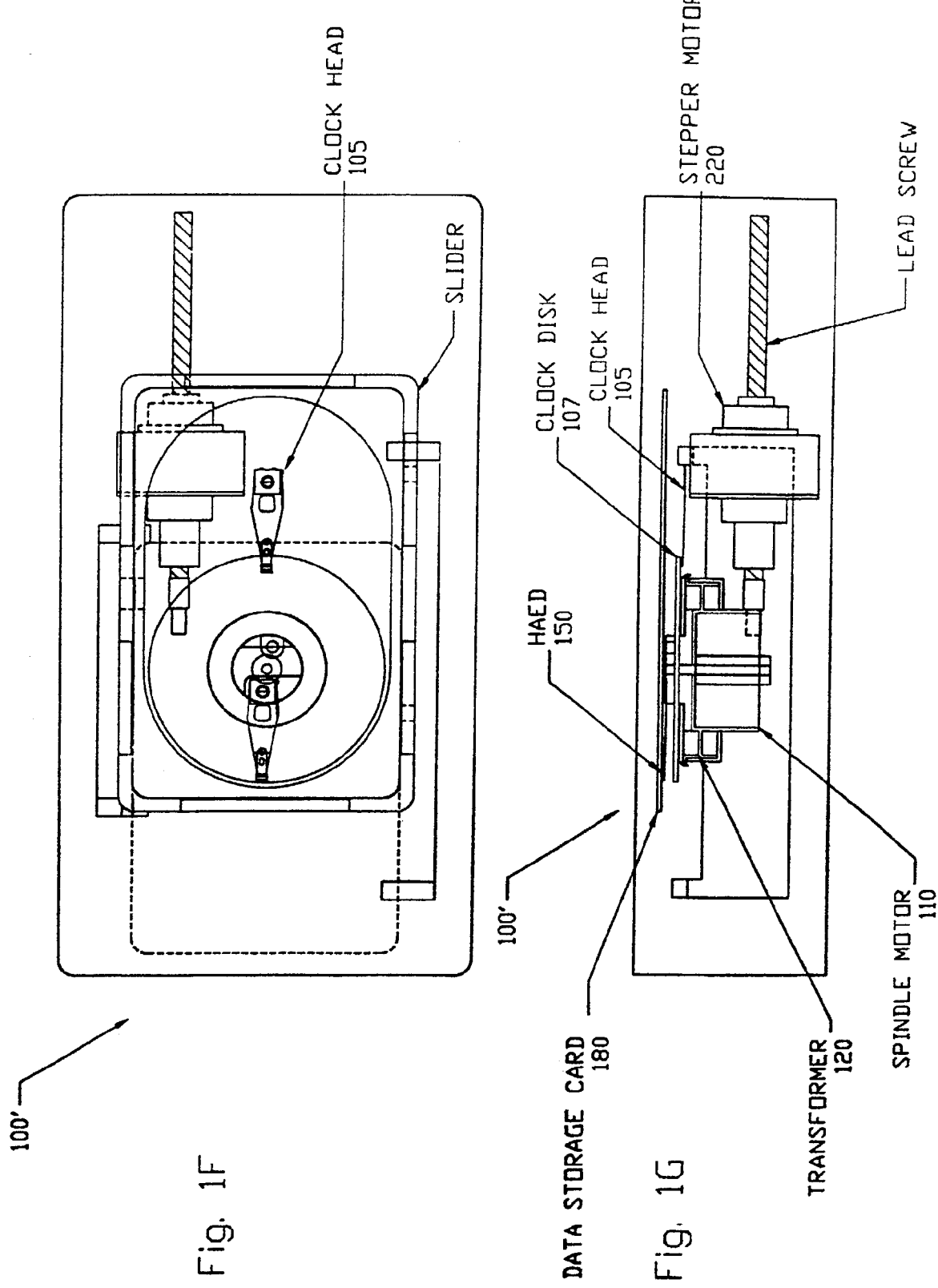

| | | | | A | | A | | Data Track N+5 |
|---|---|---|---|---|---|---|---|---|
| S Y N & A D M | S T I D X | E D I D X | G R A Y C O D E | | B B | | B B | |
| | | | | | | | | Data Track N+4 |
| | | | | A A | | A A | | |
| | | | | | B B | | B B | Data Track N+3 |
| | | | | | | | | Data Track N+2 |
| | | | | A A | | A A | | |
| | | | | | B B | | B B | Data Track N+1 |
| | | | | | | A | | Data Track N |

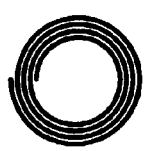    
Fig. 10F-1     Fig. 10F-2     Fig. 10F-3     Fig. 10F-4     Fig. 10F-5
    
Fig. 10F-6     Fig. 10F-7     Fig. 10F-8     Fig. 10F-9     Fig. 10F-10
    
Fig. 10F-11    Fig. 10F-12    Fig. 10F-13    Fig. 10F-14    Fig. 10F-15
    
Fig. 10F-16    Fig. 10F-17    Fig. 10F-18    Fig. 10F-19    Fig. 10F-20

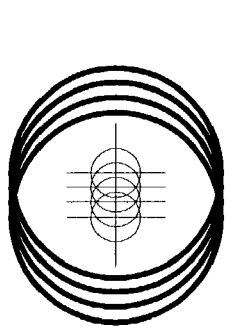 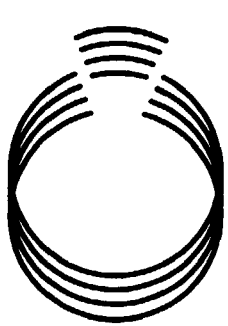 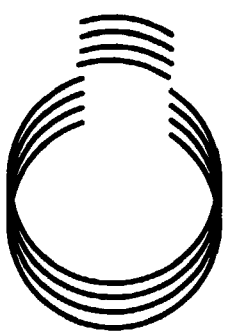 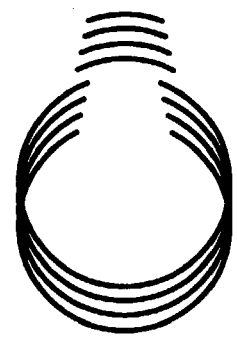
Fig. 10G-1    Fig. 10G-2    Fig. 10G-3    Fig. 10G-4
   
Fig. 10G-5    Fig. 10G-6    Fig. 10G-7    Fig. 10G-8
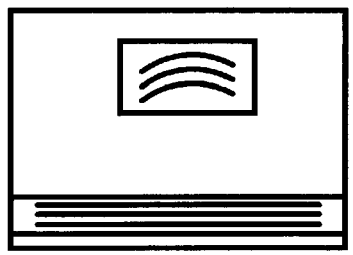 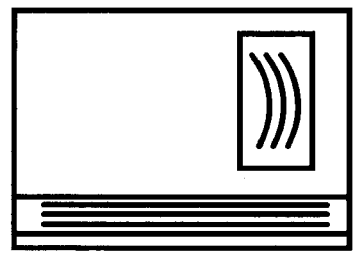 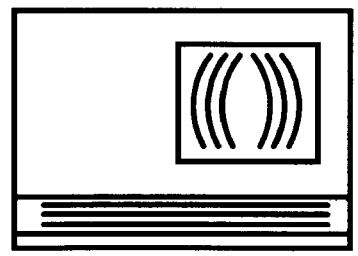
Fig. 10G-9    Fig. 10G-10    Fig. 10G-11
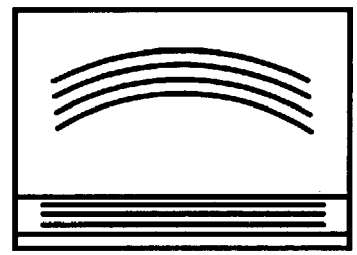 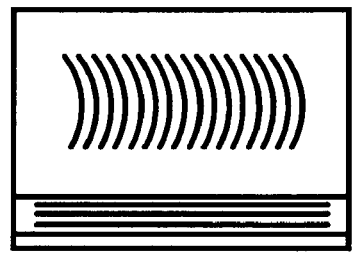 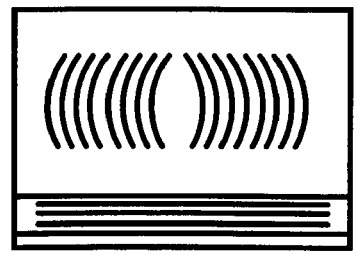
Fig. 10G-12    Fig. 10G-13    Fig. 10G-14

DATA ACCESS DEVICE USING ROTATIONAL HEAD TO ACCESS DATA STORED IN DATA STRIPS AND DATA ARC SEGMENTS OR DATA CIRCLES

This Application is a Continuation-in-Part Application (CIP) of a previously filed Provisional Application 60/419,293 filed on Oct. 16, 2002. The Provisional Application 60/419,293 is a Continuation-in-Part Application (CIP) of a previously filed Provisional Application 60/081,257 filed on Apr. 9, 1998 and a Formal application Ser. No. 09/289,427 filed on Apr. 9, 1999, by one of a common inventors of this Patent Application.

BACKGROUND OF THE INVENTION

1. Field of the Invention

This invention relates generally to systems and method for reading data from and writing data to data storage medium by employing the magnetic or optical recording technology. More particularly, this invention is related to a data card provided with data storage tracks configured with at least a linear data strip and multiple data arc segments or circular data tracks.

2. Description of the Prior Art

Conventional techniques of accessing data stored on data storage media, particularly on data cards, are limited to either reading/writing data on a data strips, e.g., magnetic data strip(s) on the back of a credit card, or on circular data tracks, e.g., a flopping diskette. Limited by these data storage configurations, the amount of data that can be stored in the credit cards are quite limited. For the purpose of preventing credit card fraud or identification theft, it is often necessary to provide more data on the credit cards such as the thumbprints or picture of the true owner of the cards. However, the magnetic strips as now commonly utilized in a credit card do not have sufficient capacity to store these data. Furthermore, the conventional credit card readers when reading the magnetic strips generally do not have the capabilities to process the data to display the picture or provide the thumb prints in order to identify the true owner of a credit card. For these reasons, despite the advancements now made in the technologies of data storage and data processing, the effectiveness of fraud prevention and identification thefts is still limited by these technical difficulties.

Furthermore, for a data card formed with multiple data arc segments, there is a need to determine the central axis of the data card to precisely position the data card for reading and writing data. As the data card has multiple arc segments, a more complex algorithm must be applied using a set of data obtained by reading data from multiple arc segments for the purpose of determining a central axis. The process is less efficient and may be time consuming thus preventing the operations of reading data from or writing data to the data card in timely manner. In addition to the need to determine the central axis of the data card, it is also required to calibrate the data signals read from the data arcs because there are variations between different cards. For such calibration, an average-amplitude of the data signals as a magnetic or optical pickup head scan over the data arcs must be calculated. The average signal amplitude determined from measurements of multiple data points are generally required for such determination. Again, for a data card that has multiple data arcs, such calibration process may required data signals from multiple data arcs and thus would be less efficient and taking up longer times and slowing down the initialization of data reading and writing operations. Due to these reasons, less efficient operation and slower initialization may often be encountered when regular data card formed with multiple parallel data arcs are implemented.

The rotational head data recording and retrieving system as that disclosed in a co-pending Patent Application is implemented to resolve the difficulties of the conventional technology. Specifically, in conventional data storage systems, the reading and writing of data are performed on concentric circular data tracks. The concentric data track configuration often presents a problem that the data-bit density varies between the outer tracks and the inner tracks. The variable bit density in data storage is due to a geometrical factor that the outer data tracks are much longer in length than the inner tracks. A common practice is to form the inner tracks with a capacity to store the data bit at a higher bit density. A more complicate servo control system implemented with more complex signal-processing algorithms is required due to the variations of data storage density between different data tracks. Additionally, by varying the data storage density from the inner tracks toward the outside tracks, the data transfer rate is also changed in accessing data from the inner tracks then outside tracks. Such variation may also cause difficulties and complications in processing the data. Higher error rates may incur due to these variations between the inner tracks and the outer tracks.

There have been designs using oscillating head arm to prescribe multiple parallel data arc at a flat data media and a constant data recording density and easier data access arrangement. There are also designs to use single or multiple rotating head pairs to prescribe multiple data arc segments on a circular track and/or on such multiple parallel track arrangements. All such designs required either oscillating head arm or head pairs configuration. All prior designs also require that the flat media to be statically positioned to signal pickup heads once the flat media is engaged or inserted to the device.

An invention implemented with a rotational-head for data recording and retrieving as that disclosed in a co-pending Patent Application is able to resolve the above-described difficulties of uneven data storage densities. However, the inefficiency and complexities of the operations to position the card and to calibrate the signal amplitude still present as technical difficulties to those of ordinary skill in the art yet to be resolved.

Therefore, a need still exists to provide an improved data access device and data-card storage configuration to process and store data in the linear data strips and also data arc or circular data tracks such that more data can be available for card user authentication applications to overcome the above-mentioned difficulties and limitations.

Furthermore, there is also a need for an improved data-card operated with new configuration and method to overcome the technical difficulties as described above. Specifically, the storage card drive system shall provide a uniform density for data storage. Also, the data card should also provide a data tack configuration to conveniently determine a central axis of the data card and to measure the average signal amplitude for signal calibration. Furthermore, it would be desirable to keep the system portable and be provided with several standardized sizes for processing standardized data-storage cards.

SUMMARY OF THE PRESENT INVENTION

Therefore, an object of this invention is to provide a data access device to operate with a data card that stores data both in a linear data strip and also in curved data arc segments or circular data tracks. The magnetic data strips may be identical to a conventional magnetic strip stored data now commonly processed by the remote data processing center as now implemented in the credit card or ID card industries. Additional data such as user's thumbprints, picture, or other information could be stored in the data arc segments or circular data tracks. These additional data may be processed locally by employing a card reader as that disclosed in this invention. With the new card readers as disclosed in this invention to operate with data cards with data stored both in the linear data strips and circular data arcs or data tracks, the difficulties and limitations encountered in the prior art can be overcome.

Specifically, this invention discloses a data access device and recording media operated with data track configuration by combining a group of linear data tracks or strips and a plurality of data arc segments or circular data tracks. The linear data strips are compatible and operable with conventional credit card or ID card readers while the data arc segments or circular data tracks contain additional authentication information for identifying a true owner of a credit card or ID card to prevent credit card fraud or identification theft.

Another object of the present invention is to provide a data storage-card drive system with single pickup head moving above the data-storage card in rotational movement. The data read-write functions are enabled only for arc-segments of the rotational movement guided by servo data written to servo sectors on the data arc with proper offsets. Also, the data tracks are arranged as plurality of parallel arcs, e.g., half-circles. At least one special full circle data track is provided for conveniently determining a central axis of the data card and for obtaining a measurement of average amplitude such that the above mentioned difficulties and limitations encountered in a regular data card can be overcome.

Specifically, it is an object of the present invention to provide a data-storage card drive system with single pickup head driven by a motor, e.g., a brushless motor, to rotate over the data-storage card with the rotation axis perpendicular to the card surface. The motor is mounted on a carriage for making horizontal movement along a longitudinal direction of the data card. An X-Y table is provided to move and position the card on the center relative to the rotation of the pickup head. The data card is formed with at least a data strip and also a plurality of data arc segments or circular data tracks. The rotational data head is provided with options to 1) access data from both the data strip and the data arc segments and circular data tracks, or 2) to access data only on the arc segments or circular data tracks. In a preferred embodiment, the data card is formed with at least one full circle data track for conveniently centering the data card and to obtain average signal amplitude for calibrating the amplitude of the signal read from the data card. The present invention also provides a solution to dynamically engage the flat media and signal pickup head(s).

Another object of the present invention is to provide a data-storage card drive system for performing the data access tasks over a data storage medium surface, which has uniform data storage density. A new configuration of data-tracks formed as parallel arc or arc-segments, e.g., semi-circular data track, is implemented such that all data tracks have substantially the same length for data storage and the data bits are stored with uniform density. In the meantime, at least one full circle data track is formed on the data card for enabling efficient operations of positioning the data card and obtaining a measurement of average signal amplitude for signal calibration.

Briefly, in a preferred embodiment, the present invention discloses a data card that has a linear data strip and a plurality of substantially parallel data arcs disposed on a flat data storage medium. In a preferred embodiment, the data arcs further include at least one full circle data track provided with data for conveniently determining a central position of the data card in a data drive system. The data stored in the full circle data track can also be conveniently used to obtain a measurement of average signal amplitude to calibrate the signal measurements from the data card.

These and other objects and advantages of the present invention will no doubt become obvious to those of ordinary skill in the art after having read the following detailed description of the preferred embodiment, which is illustrated in the various drawing figures.

BRIEF DESCRIPTION OF THE DRAWINGS

FIGS. 1F and 1G show the top view and cross sectional view respectively of a magnetic or optical servo writer of this invention;

FIGS. 10E-1 to 10J-6 are top views for showing the data storage data tracks can be configured as different kinds of curved arc-segments of different shapes, sizes, facing different directions disposed on a data card in combination with linear data strips.

DETAILED DESCRIPTION OF THE PREFERRED EMBODIMENT

Figure 1A:
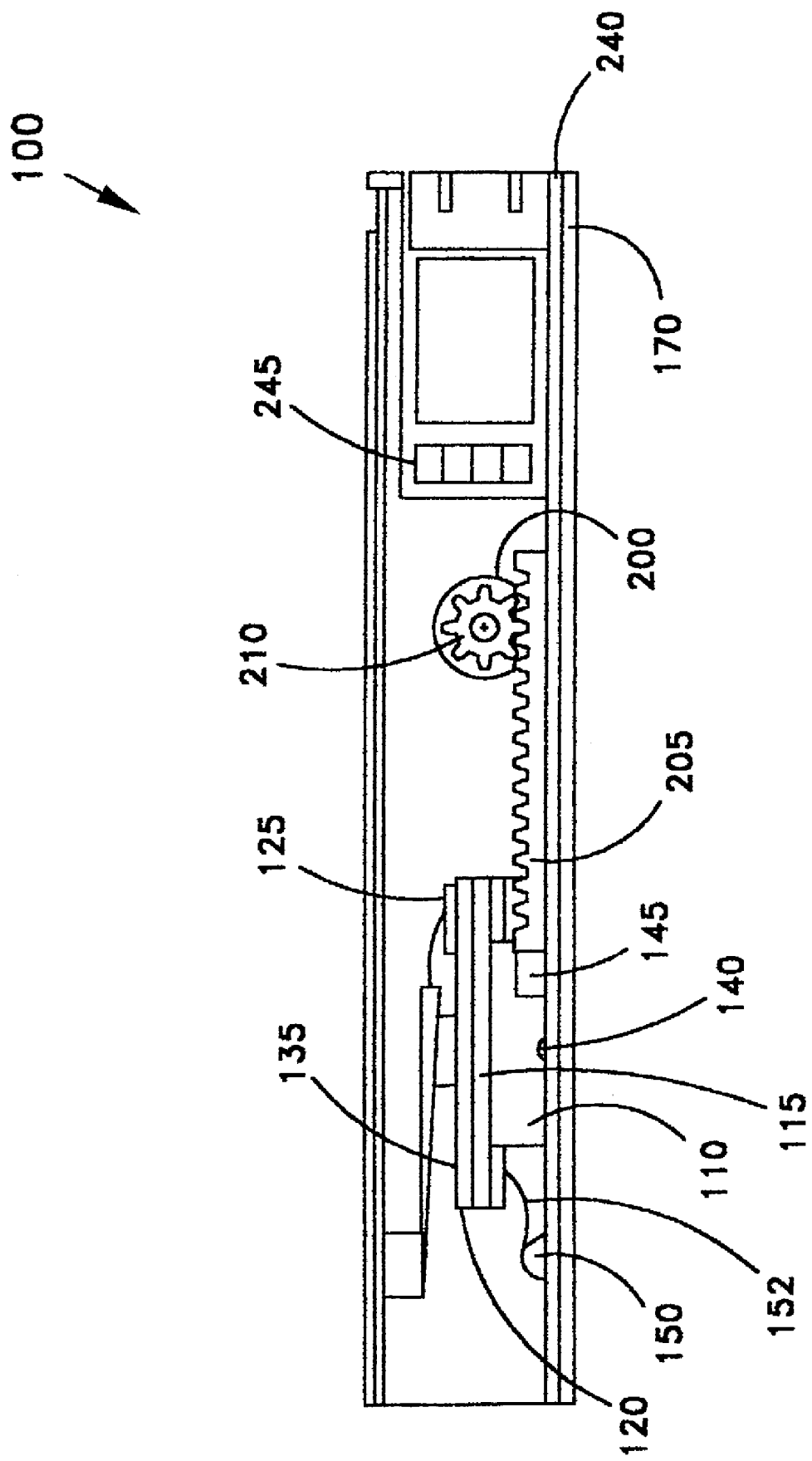
FIGS. 1A and 1B shows a cross sectional view and a top view respectively of a data card drive system of this invention.
Figure 1B:
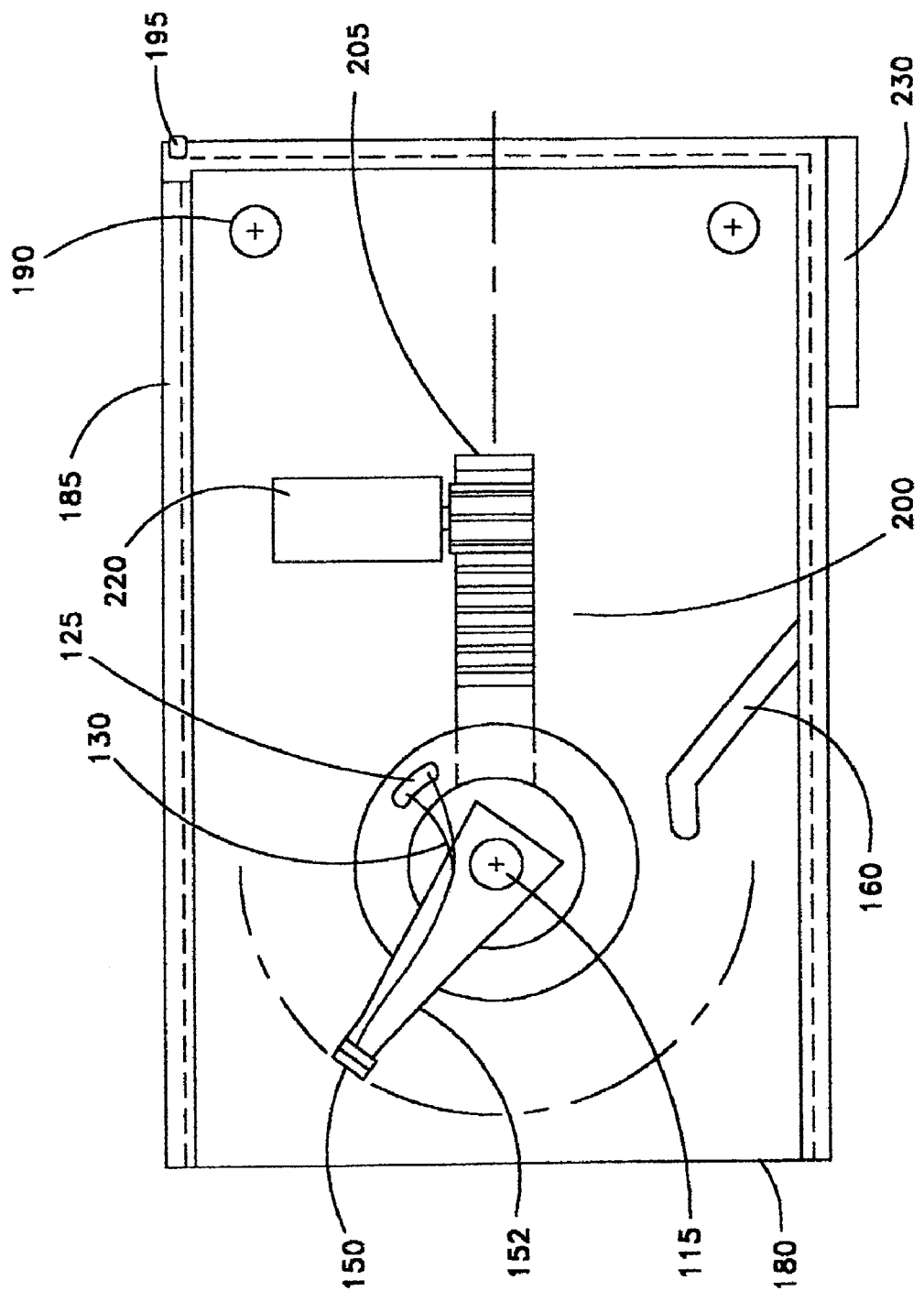

FIGS. 1A and 1B show a cross sectional view and a top view respectively of a data-card drive 100 of the present invention. The data-card drive 100 can be configured for reading and writing data-cards of different sizes, e.g., a PCMCIA type card or common credit card size. The data-card can also be of different shapes such as a square, a rectangular, a circular disk, or a card with straight and parabolic edges or different types of arc-edges. The data-card drive 100 includes a motor 110, e.g., a DC brushless motor. The motor 110 is provided to operate at a low speed to conserve battery power, at high speeds to achieve fast data access time. The motor 110 is further provided to function at two different modes, i.e., a sleep mode when not being deployed, and a wake up mode for normal data access operations. The motor 110 is mounted on a carriage 115 with a pickup head assembly mounted to the motor rotating shaft assembly. Half of a magnetic transformer, 120-1, which may either being a ring type, a round-disk type, or other geometrical shapes, is mounted onto the motor rotating shaft assembly; the other half of the magnetic transformer 120-2 of similar configuration is mounted to the fixed part of motor assembly. Signal wires 130 form head are soldered onto the rotating half of the transformer 120-1 with the soldering pad 125, that can also be a spring pressed connection, for transmitting the read/write signals via the magnetic transformer 120. The magnetic transformer 120-1 and the soldering pad 125 are covered by a magnetic flux shield plate 135 for shielding the magnetic flux generated by the magnetic transformer to prevent DC erase of data. A ground spring 140 is applied to perform the function of dissipating electric static discharges. Optionally, a brake-magnet 145 is provided to fix the "parking" position of the motor 110 in the sleep or power off mode during the time when there is no data access activities.

A read/write head 150 is mounted via an extended head-arm 152 to the brushless motor 110 via a head-arm mounting assembly mounting holes 155 to the head carriage 115. A head loading/unloading arm 160 is mounted on the baseplate 170. The loading/unloading arm 160 presses to the head-arm 152 at the unload position at a drive-device power-off mode. The loading/unloading arm 160 is removed from the head-arm 152 when a data card 180 is loaded and the power for the drive device is turned on.

In order to assist a smooth loading of the data card 180 into the drive device 100, a card guide plate 185 is provided. The data-card drive system 100 further includes one or several data card pins 190 to engage and fix the position of the data card 180 when the data card 180 reaches a designated operational position. The data card pins 190 increase the compatibility and interchangeability of different types of data cards for data access operations using this data card drive system 100. The drive system 100 further includes an on/off switch 195, which is turned on when the data card 180 reaches its final position.

Figure 1C:
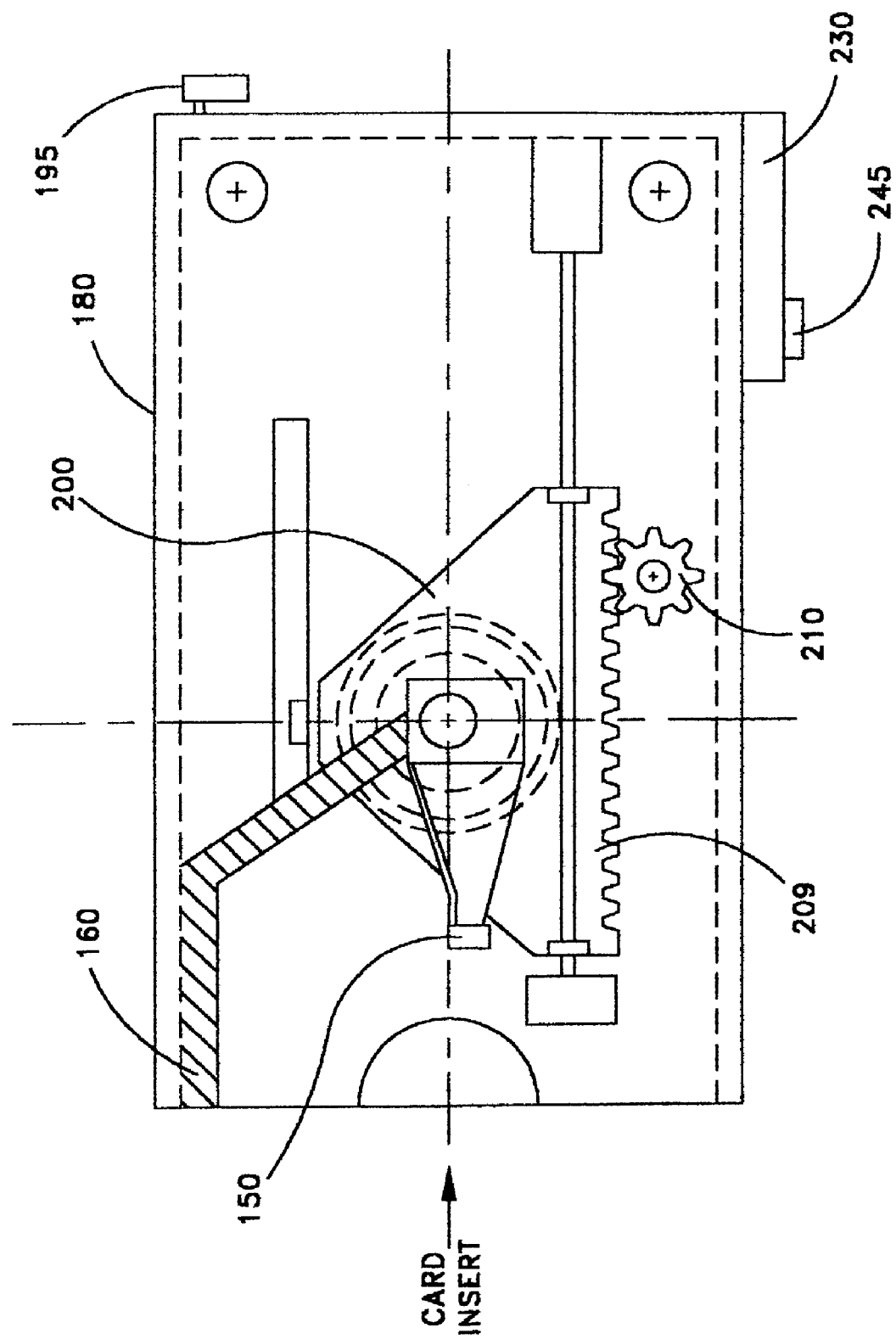
FIGS. 1C and 1D are cross sectional views for showing the details of the motor rack mounting and the head loading/unloading assembly; (please use the new cam designs)
Figure 1D:
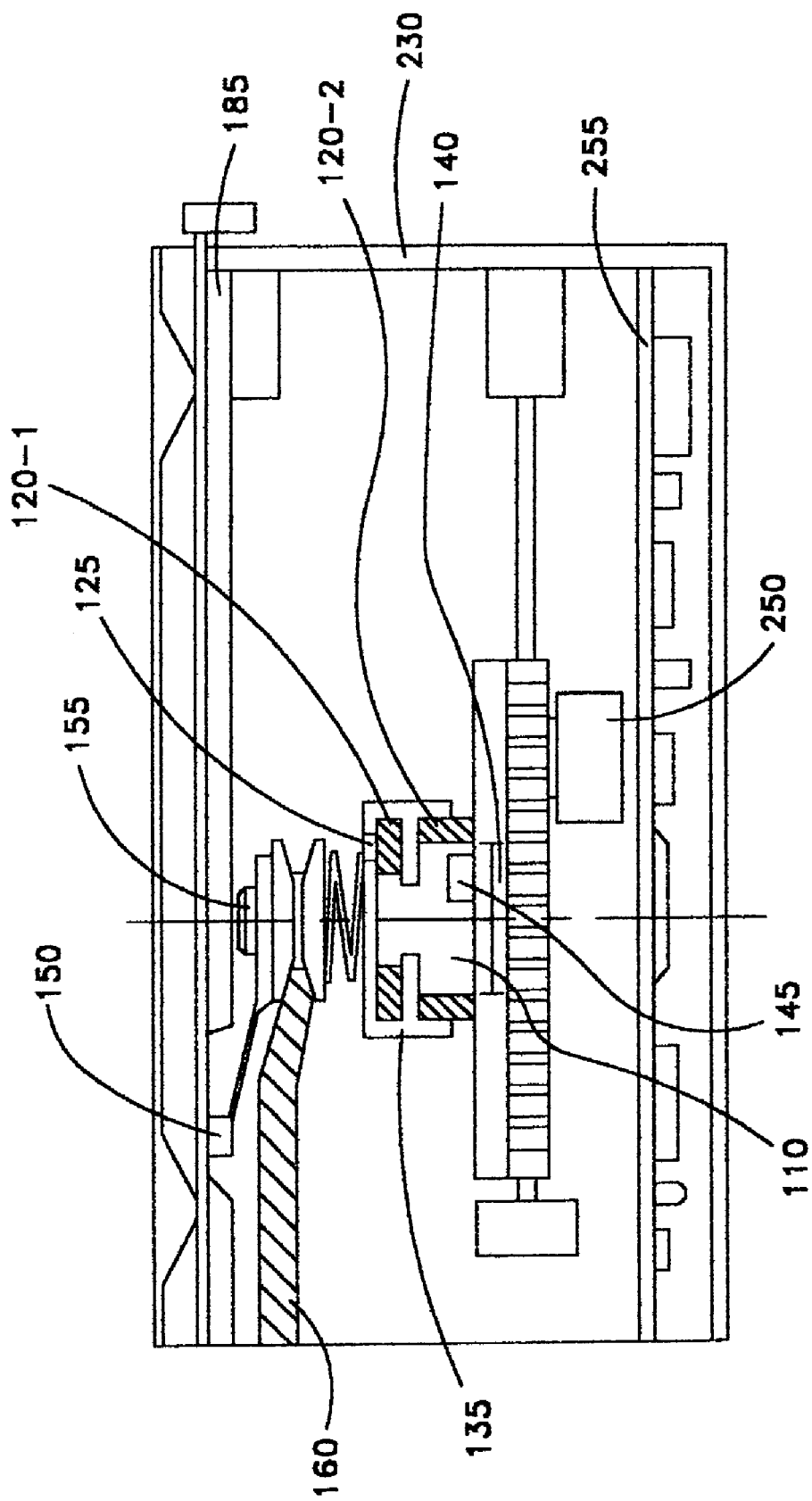

The brushless motor 110 is mounted onto a motor-rack mount 200 with a rack 205 and a pinion 210. A step motor 220 is employed to control the linear movement of the motor 110 or the movement of the data card 180. The drive device 100 further includes a LCD display 230 to indicate the track position of the head 150 in reading or writing of data onto the data card 180. Mounted on the base plate 170 is a printed circuit board 240, which supports a track locator switch 245. The printed circuit board 240 further supports various kinds of circuits for performing the functions of control and data access. These circuits includes head tracking circuit 250, IC preamplifier 255, head loading/unloading circuits, disable/enable read-write function circuit, servo control integrated circuit (IC), motor control IC, data separator IC, ADI interface IC, USB interface IC, PCMCIA interface IC, USB connector, PCMCIA connector, and other circuits required for controlling and operating the data card drive system. FIGS. 1C and 1D are cross sectional views for showing the details of the rack 205, the pinion 210, and the head loading and unloading assembly 160 to lift the head when the drive device 100 is turned off. A head arm lifter 103 has a wire type hook 103A positioned above the pickup head arm 152. The sliding of the head arm lifter 103 with the wire type hook 103A along the motor shaft assembly can lift or lower the pickup head arm 152 and in turn lift or lower the pickup head 150. The pickup head arm 152 is rotating with the motor shaft and the pickup head 150. Regardless of where the pickup head 150 when the rotational movement stops, the arm 152 can always engage into the head lifter 103 slot and sliding the head lifter 103 along the motor shaft.

The drive device 100 as described above is also provided with an option to perform the functions of a servo writer. A novel servo writer is disclosed in this invention which can be manufactured with simplified manufacturing processes. The servo writer includes a storage card loading assembly that is structured similarly to a card guide 185 of the device 100. The storage card can be inserted horizontally inserted for direct contact with the pickup head 150. Or, depending on specific application, the data storage card can be inserted from a vertical slot opening and then flip over for contact with the pickup head. In writing the servo data, the pickup head 150 is rotating along different data tracks. The pickup head is moved to different tracks during the operation of writing servo data by either moving the head/motor assembly mounted on the shaft or by keeping the head/motor assembly stationary while horizontally moving the data storage card. The magnetic transformer is employed in writing the servo data onto different data tracks where the cables are arranged without being twisted when the pickup head is making rotational movement.

FIGS. 1F and 1G are a top view and a cross sectional view of a preferred embodiment of a data-card servo writer system 100', which has a clock head 105 connected to a clock disk 107. The clock disk 107 is disposed below the magnetic or optical data card 180 and de-coupled from the data card 180. The motor drives the pickup head 150 also drive the clock disk 107. The clock disk can be rotated while the clock head 105 is fixed and stationary and mounted on the frame assembly of the servo writer system 100'. The clock head 105 is employed to write clock signals, e.g., a binary bit 1 for the whole cycle. All of the data bits on the entire data track of the clock track are binary bit "1". Then, a pulse is stopped to write a binary bit "0" to provide that "0" as index while using all the bits having a binary value of "1" for timing to format the card. Read and write signals of the clock head 105 is transmitted through wires to the clock disk 107 formed on a printed circuit board. The clock head 105 is employed to write the clock signals onto the magnetic or optical clock disk and to read back the signals. The clock signals read back from the magnetic or optical clock disk are used as timing signals to format the card to include the servo patterns to be further described below. Once the magnetic or optical data-card 180 is formatted by the servo-writer system 100', it is ready for data read/write operations by applying a regular magnetic or optical data-card drive system as that shown in FIGS. 1A to 1E. The formatted sectors on the magnetic or optical data-card 180 are also write-protected to prevent incidental writing over these segments.

Figure 1E:
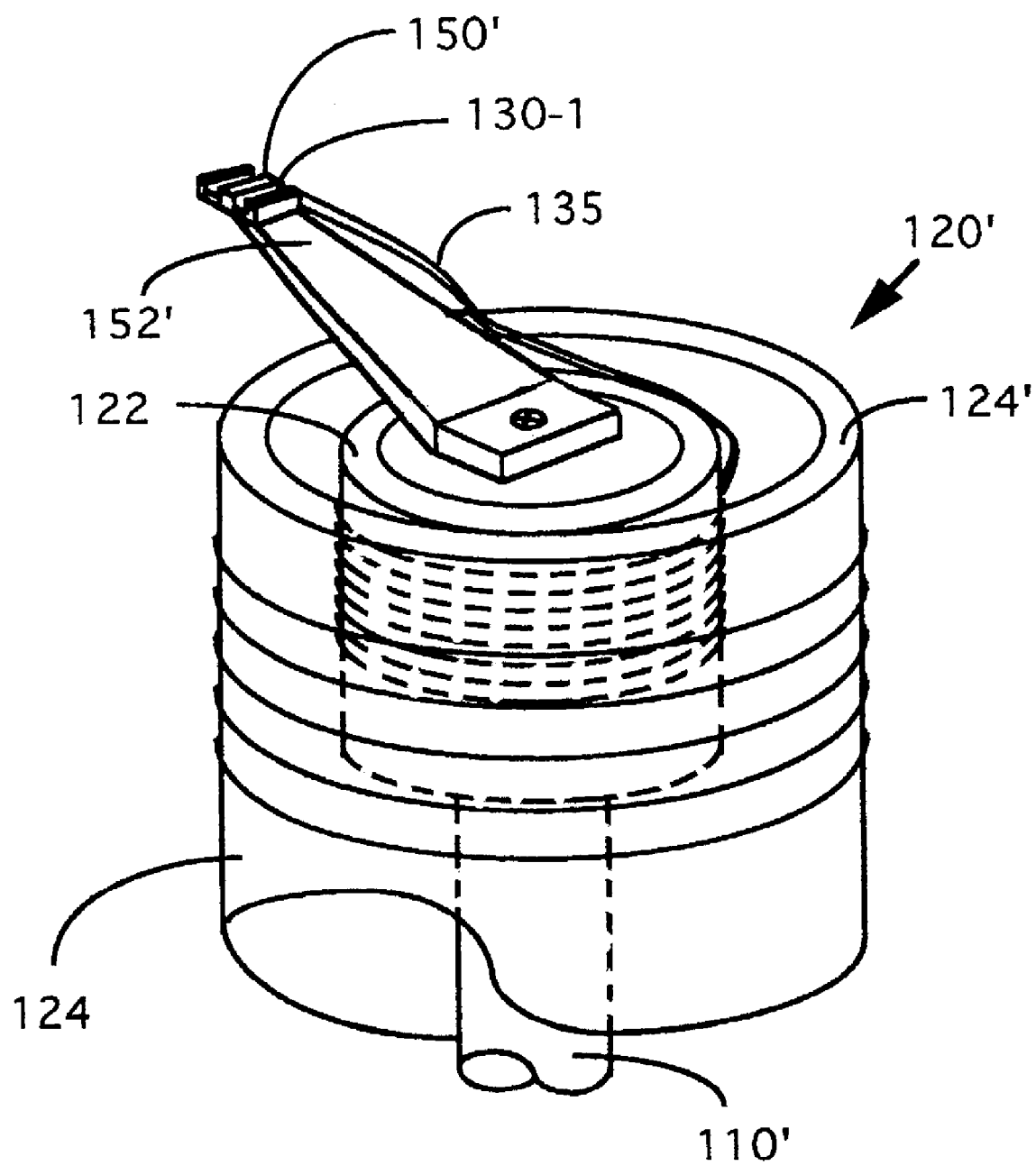
FIG. 1E shows a perspective view of the pickup head and the wires winding configuration serving as read/write data signal transformer.

FIG. 1E is a perspective view of an alternate configuration of a data signal transformer 120'. The data signal wires 130-1 connected to the pickup head 150' supported on the arm 152' for the pickup head 150' are first winding around an inner signal transforming cylinder 122', which rotates with the rotation shaft or the motor 110'. A stationary hollow pipe 124' is placed around the inner signal-transforming cylinder 122'. A set of signal transforming wires wrap around this stationary hollow pipe 124'. For read/write data, an electric signal representing a binary bit can be transferred from a pickup head 150' through the wires 135' to the wires wrapping around the inner signal-transforming cylinder 122'. The electric signals, typically an electric pulse, transferred to the wires around the inner cylinder 122' can be detected with variations of electromagnetic field by a set of wires wrapping around the stationary hollow pipe 124'. Similarly, the data signal for the pickup head 150' can also be provided to the wires wrapping around the stationary hollow pipe 124' as electric pulses and detected by the wires wrapping around the inner signal transforming cylinder 122' for transfer to the pickup head 150'. The wires around the inner and outer cylindrical pipes function as inductive coils serving the function of data signal transformation.

Figure 2A:
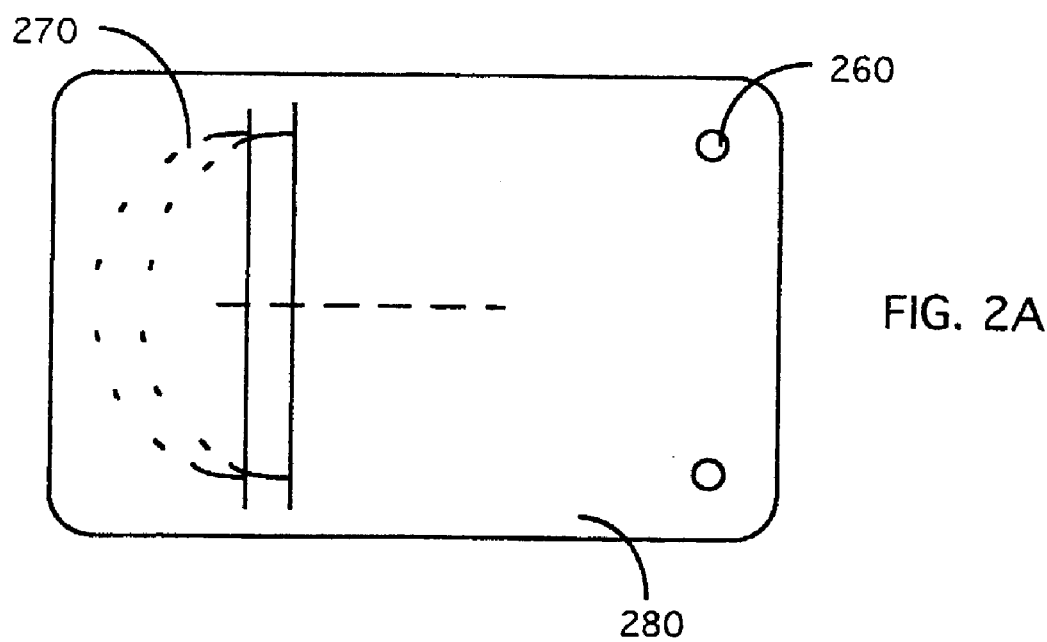
FIGS. 2A to 2C are respectively a top view, a cross sectional view and a bottom view of a data storage card with data tracks formed for storing bits with uniform density in each of these data tracks.
Figure 2B:
Figure 2C:
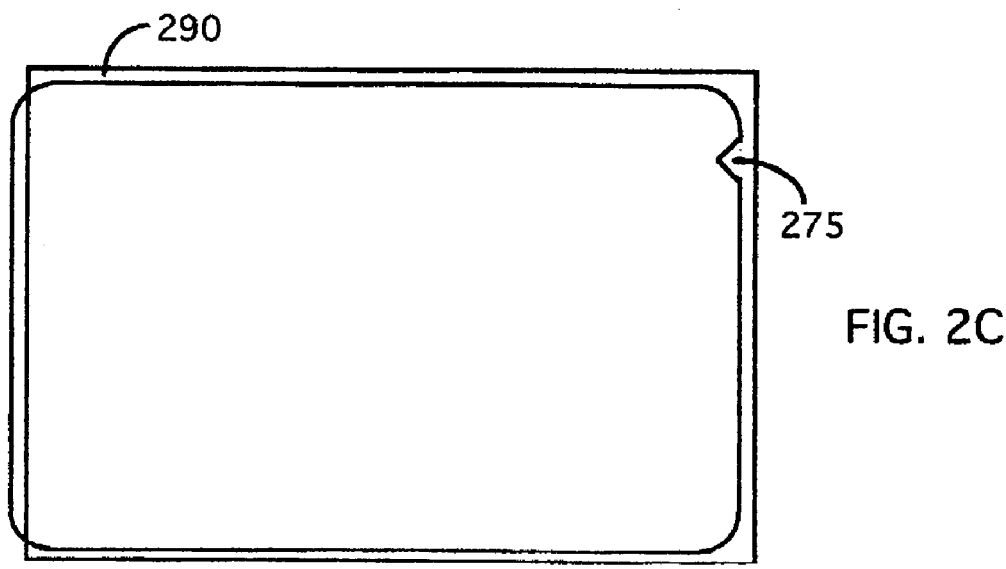

FIGS. 2A to 2C are respectively a top view, a cross sectional view, and a bottom view of a data card 180 of the present invention. The data card 180 is formed on a substrate plate 250. The substrate-plate 250 for magnetic recording is composed of non-magnetizable materials with a flat surface, e.g., a plastic or glass substrate plate. For magnetic recording, a magnetizable material can also be employed to form the substrate plate 250. The substrate plate 250 is then coated with a thin layer of recording medium on one side or both sides. For magnetic recording, the coating are formed by magnetic particles coated on one-side or both sides of the substrate plate 250. The magnetic coating can be directly on the surface of the substrate plate 250 or on a Mylar type of material with adhesive layer for attaching to the substrate plate 250. For magnetic recording the recording medium layer can be formed by a process similar to that of a magnetic compact-disk (CD), CDR, LD, or digital video display (DVD) disks. The data card 180 can be formed with standardized sizes, e.g., PCMCIA standard sizes or standard credit card sizes, and has round or elongated holes 260 for fixing the card at pre-designated positions to initialize a data access operation. The holes 260 are fitted to the pins 190 to provide the self-centering and locking functions. The data storage card 280 can therefore be repeatedly placed at a pre-designated position with reliable accuracy. The data card 180 is provided with a plurality of data tracks 270 for storing data bit on each track. Each of these data tracks is formed as substantially an arc or arc-segments track. The data tracks 270 are substantially of a same length and are substantially parallel to each other. The data tracks 270 are formatted to include multiple sectors. One or several of these sectors can be flexibly employed to provide servo data for the purpose of identifying track locations to enhance sector seeking during a data-access operation. The servo-data are provided in sectors near both ends of the arc or arc-segments data tracks 270 as shown in FIG. 2A. For the purpose of more precisely positioning the data card 180 in a drive device, a notch 275 is formed near the inner end of the data card 180. With the notch 275, the data card 180 is more conveniently placed into the drive device fitted to the initial card position ready for operation relative to the position of the pickup head 150. The data card 180 is then covered by a protective coating 280 to protect damages from exposure to water, dust and other foreign particles introduced through the daily operational environment. The data card 180 is then stored in a data card envelop 290 for storage and shipment. The data storage tracks of the data card may contain user application and system configuration data. The recorded data can be updated in the field. Application system can either encrypt or decrypt the recorded data. Application system can also change the configuration such as set and reset the write protection, the password and other features related to the data-access operations.

Figure 2D:
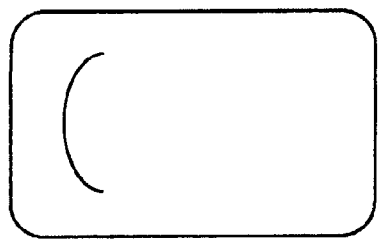
FIGS. 2D to 2Q show the top views of the data storage card of this invention where the data tracks can be arranged in arc-segments of different shapes, sizes, and facing different directions.
Figure 2E:
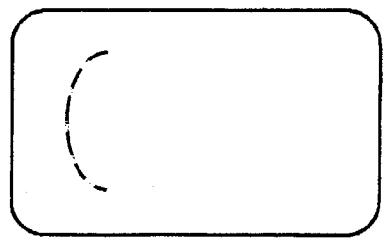
Figure 2F:
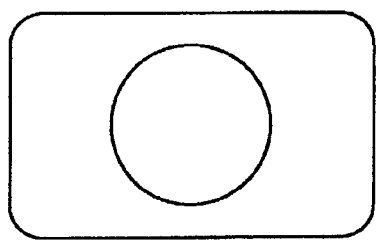
Figure 2G:
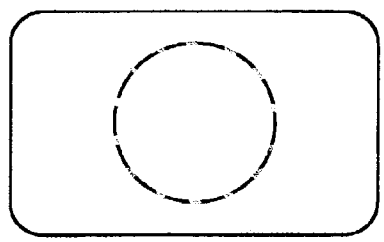
Figure 2H:
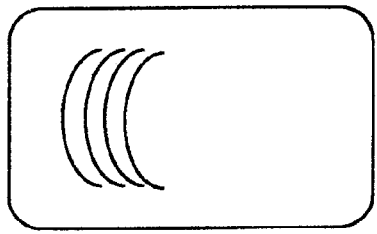
Figure 2I:
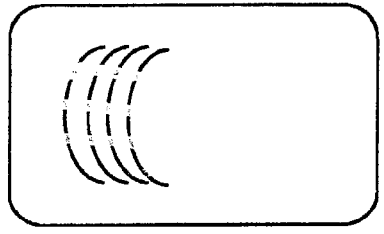
Figure 2J:
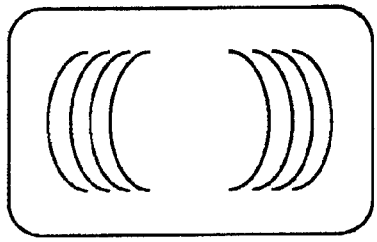
Figure 2K:
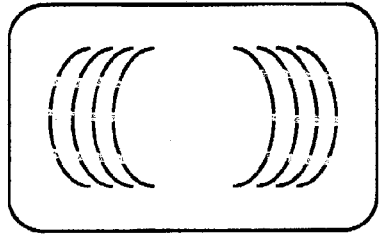
Figure 2L:
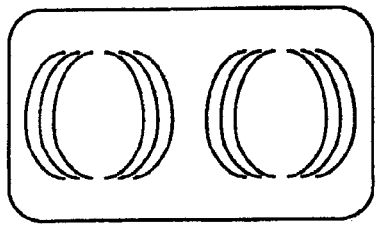
Figure 2M:
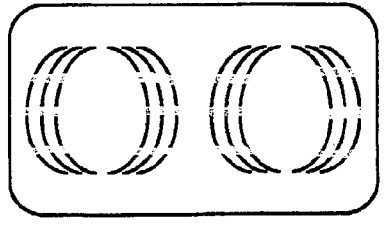
Figure 2N:
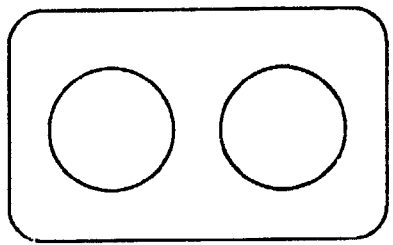
Figure 2O:
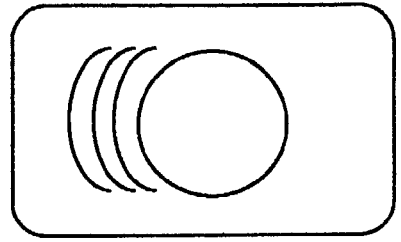
Figure 2P:
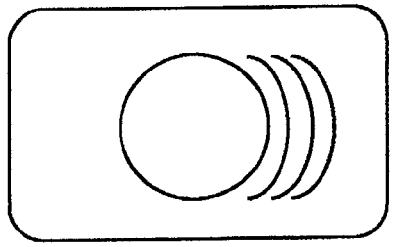
Figure 2Q:
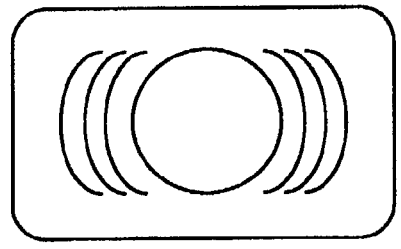

FIGS. 2D to 2Q are top views of the data storage card 180 for showing different configuration of the data tracks 270. The data tracks 270-1 can be parallel arcs facing opposite directions on either side of the data card 180 as shown in FIG. 2D. Alternately, each of the data tracks 270-1 as parallel arc as that shown in FIG. 2D can be partitioned into a plurality of arc-segment 270-2 as that shown in FIG. 2E. In a similar manner, the data tracks can be parallel arcs 270-3 formed over the entire data card area as that shown in FIG. 2F. Furthermore, each of the parallel arcs 270-3 of FIG. 2F can also be partitioned into a plurality of arc segments 270-4 as that shown in FIG. 2G.

Figure 3A:
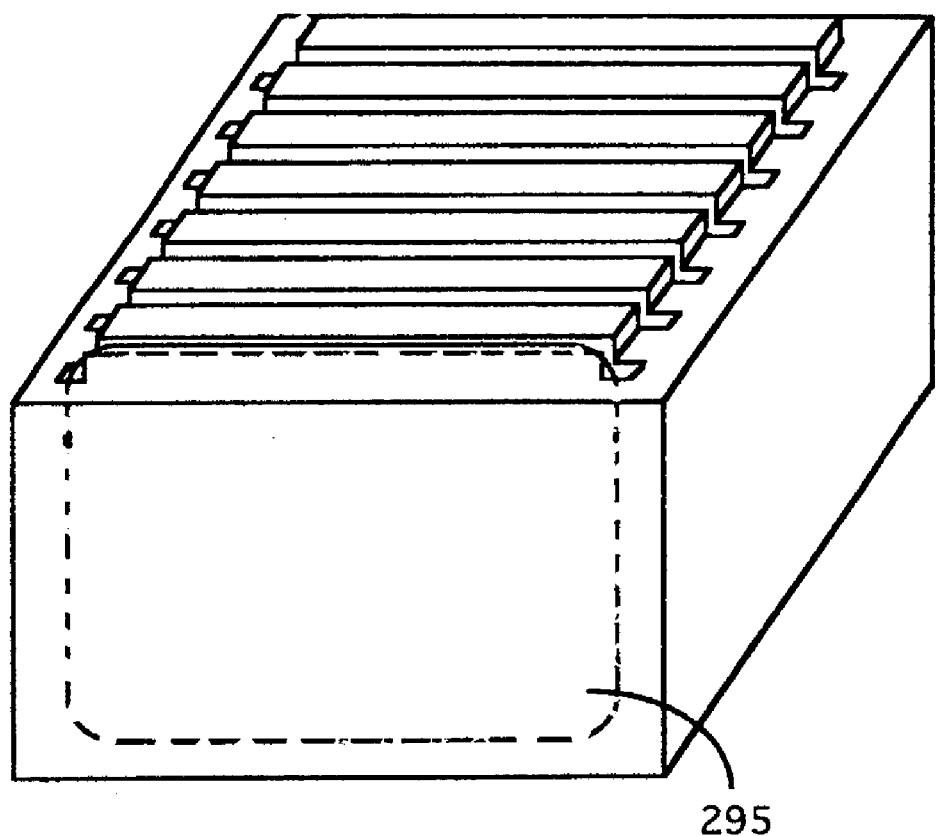
FIGS. 3A and 3B are a perspective view and a cross sectional view respectively of a data card storage box.
Figure 3B:
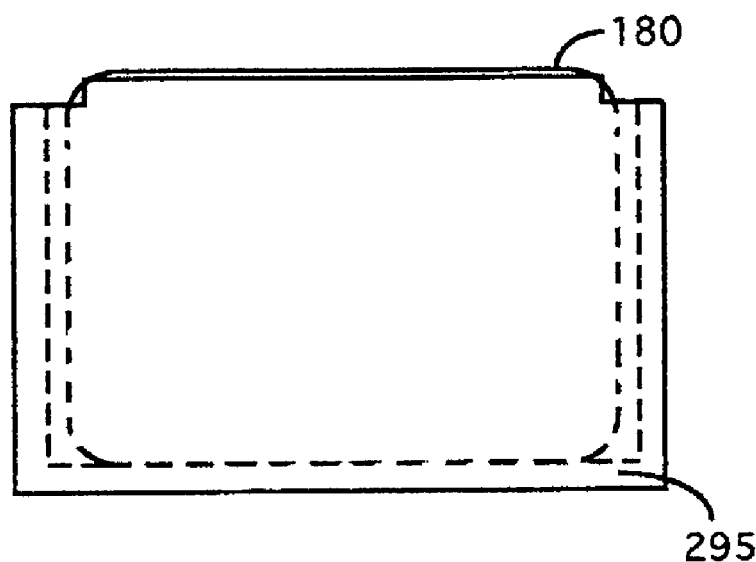

FIGS. 3A and 3B are a perspective view and a side view of a data card storage rack 295 for storing a plurality of data card 180 therein. The data card storage rack 295 as shown can be formed as partitioned storage box with each compartment ready to receive one data card 180. The data card storage rack 295 can function as a portable digital camera album or a backup data store for long term data storage.

Figure 4:
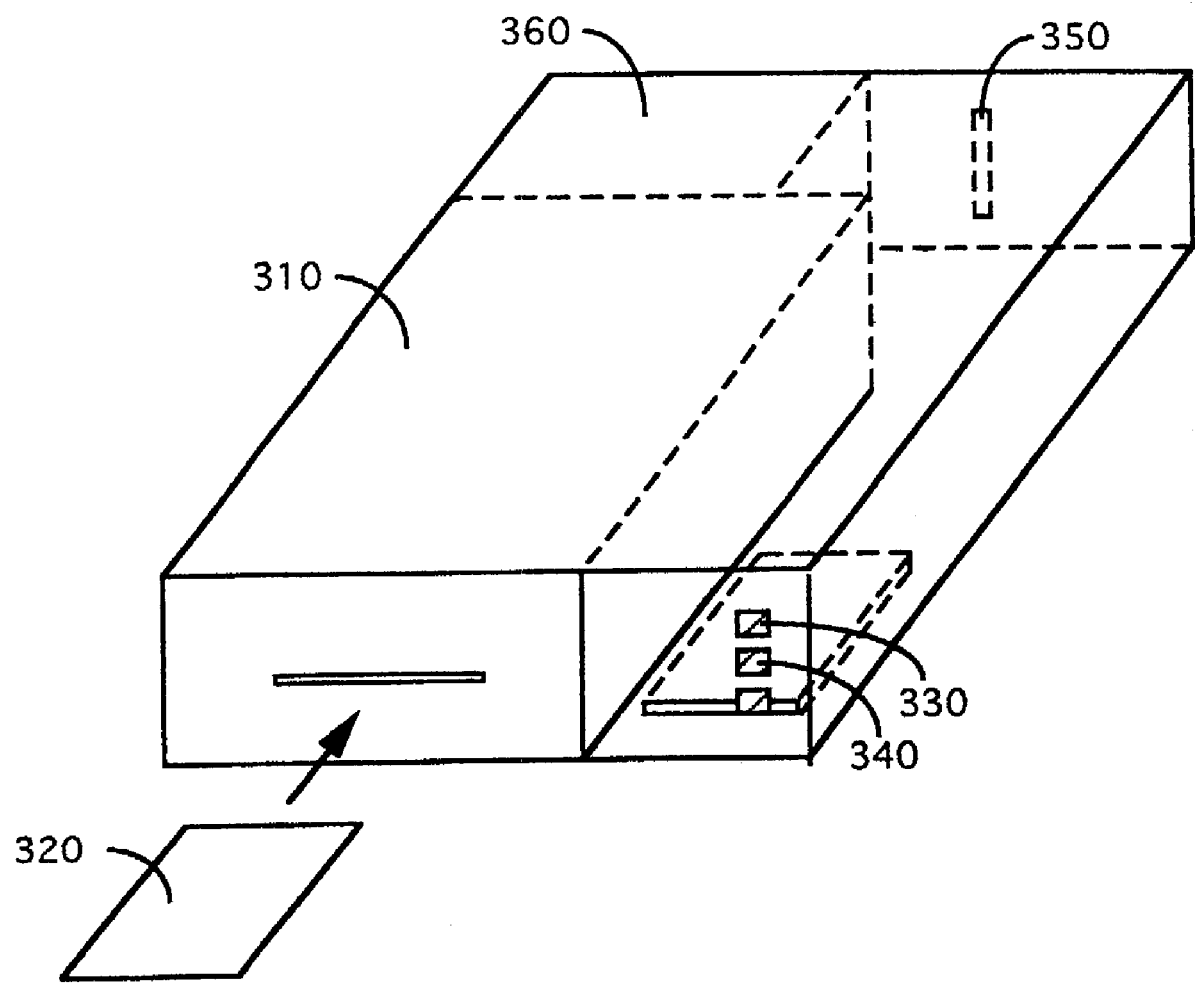
FIG. 4 is a functional block diagram of a subsystem of this invention includes a data card drive device of FIG. 1A to 1C for reading/writing data storage card of FIGS. 2A to 2C.

FIG. 4 shows a subsystem 300 of this invention that includes a data card drive device 310 identical with the drive device 100 described above according to FIGS. 1A to 1C. The disk drive device 310 performs the data access tasks on a data storage card 320 identical to the data card 180 described above according to FIGS. 2A to 2C. The subsystem 300 further includes a local memory 330, which can be a DRAM or SRAM memory device connected to the disk drive device 310. The data stored in data card 320 can be first down loaded to the memory device 330 through a data bus for data storage. The subsystem 300 further includes a function control panel 340 to allow a user to control the subsystem startup, shutdown, save, update, and duplication of the data stored in the card. The subsystem 300 is further provided with a connection terminal 350 for connection to a personal computer, a printer, a scanner or other peripheral devices for operation together with the drive device subsystem 300. A power supply 360 is employed and connected to the subsystem 300 to provide power necessary for operating the drive device 310, the memory 340 and the control panel 330.

Figure 5A:
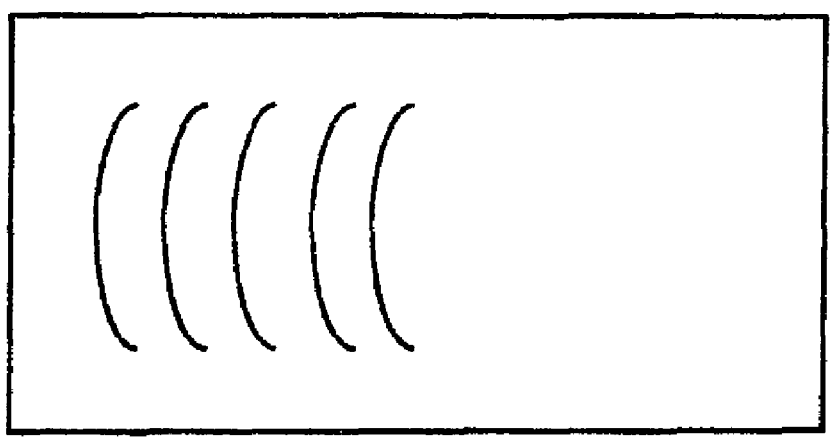
FIGS. 5A and 5B show the data tracks on a magnetic or optical data card with data tracks for writing servo data thereon.
Figure 5B:
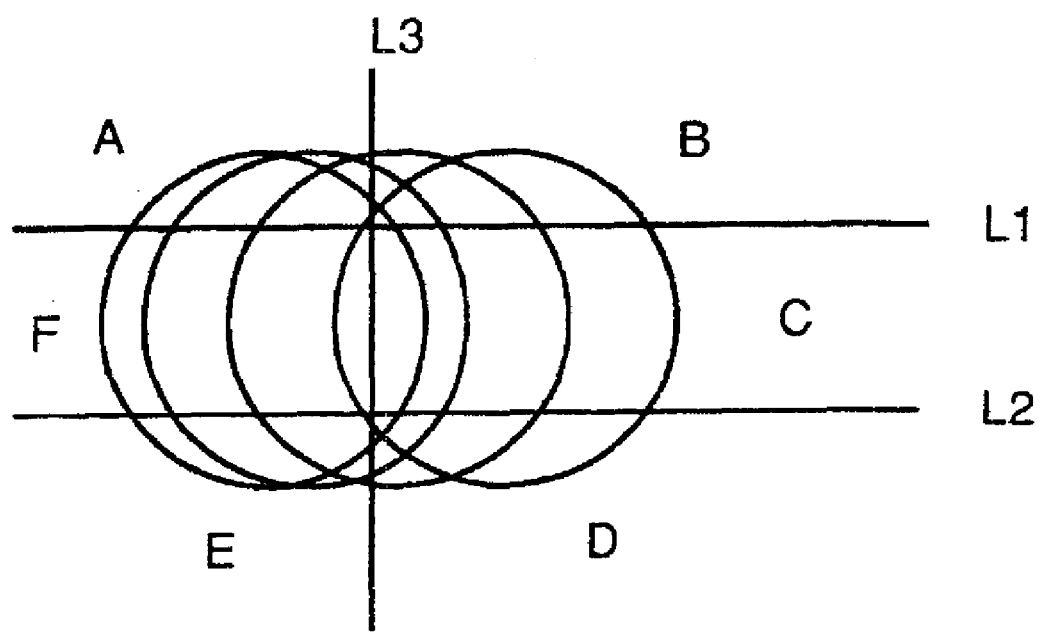
Figures 5C, 5D:
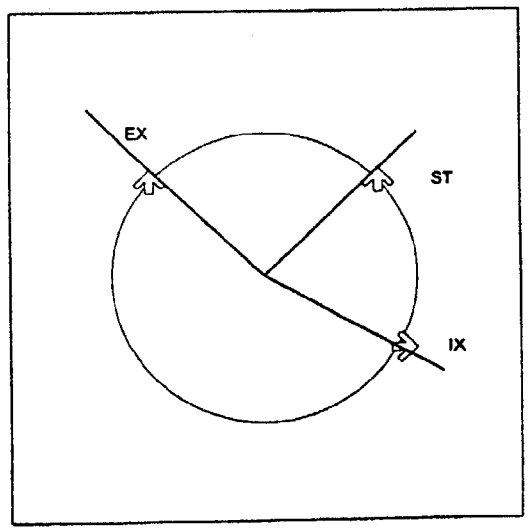
FIG. 5C shows an exemplary pattern of servo data written onto a data track.
FIG. 5D shows the position indexes for servo control.

Referring to FIGS. 5A to 5C for examples to illustrate the servo signal patterns written onto the arc segments of the data-storage tracks on a data storage card. FIG. 5A shows the data storage tracks as arc segments, which may or may not be circular arcs. The servo writer must write servo signals on these data-tracks. Referring to FIG. 5B, the surface area of the magnetic or optical data-storage card is divided into zones A to F according to clockwise direction. The servo writer should be disabled for Zones A, B, D, and E since these zones are not part of the data tracks. The servo writer must also be disabled in zone E because the servo data may be overlapped and create confusions in the process of pickup head location and track determinations. It is obvious the conventional servo writer and control mechanisms can no longer be employed for the magnetic or optical data card drive system of this invention.

As shown in FIG. 5A, the length of the data tracks depends on the size and dimensions of the data card. Each data track is divided into N segments and each segment is provided to contain pre-defined servo data, prerecorded data and/or definitions of area for data records. FIG. 5C is an example of the data arrangements across the tracks of such segment. The total number of data tracks N is determined by the requirements of the accuracy of the mechanical and electrical responses. The servo data shown in FIG. 5C can provide the track profile, the location of the track and the relative location of signal pickup head to a data track along a track.

Referring to the details of data arrangement shown in FIG. 5C, the signals generated from data bit-patterns A and B are for position determination. Each data track has a half data slots provided for A and half of the slots provided for B. The balance of A and B detected by the pickup head and the track location determination circuits provide indications that the pickup head is traveling in the center of the data track. Table 1 shows the data sample employed for providing servo data for track and location determinations as the pickup head is traveling over the surface of the magnetic or optical data storage card.

TABLE 1

Example of Partial Servo Segment Data

| SYNC | 1010101010101010 |
|---|---|
| ADM | 1000000010000001 |
| ST IDX | 11 for First Segment    00 for other segments |
| ED IDX | 11 for last segment 00 for other segments |
| A | 0000001100000000 |
| B | 0000000000000011 |

Referring to FIG. 5D, since the data track can only be arc-segments as that shown FIG. 5A, the servo writer must start and stop to layout patterns at pre-determined locations. An index is used as a reference point at a fixed location on the magnetic or optical data-storage card. The starting point SX and the stopping position EX of the servo data are derived from the reference point IX as shown in FIG. 5D. A servo control circuit is employed to enable and disable the pattern layout process and to move the magnetic or optical pickup head and the flat data-storage medium, i.e., the magnetic or optical data storage card by using the feedback by detecting these three indices. An exemplary functional block diagram for implementing the control logic in the servo control circuit is shown in FIG. 5E.

According to FIGS. 5A to 5E, this invention discloses a magnetic or optical servo writer. The magnetic or optical servo writer includes a magnetic or optical pickup head for rotationally moving over and writing servo data in a magnetic or optical flat data-storage medium. The magnetic or optical servo writer further includes a clock head for providing clock signals to the pickup head and to write clock signals in the clock disk. The magnetic or optical pickup head is provided for writing SYNC data for synchronization of read channel, and ADM data for providing address mark for indicating data-types following the ADM data. The magnetic or optical pickup head is provided for writing ST IDX data for indicating a first valid data segment, ED IDX data for indicating a last valid data segment, and GRAY CODE data for indicating a head number, a sector number, and a track number. Furthermore, the magnetic or optical pickup head is provided for writing SERVO POS data for indicating a relative position of signal head to a data track, DATA & GAP data for indicating an area for containing pre-recorded data. In a preferred embodiment, the magnetic or optical pickup head is provided for writing index data for indicating a valid data track segment.

Figure 5E:
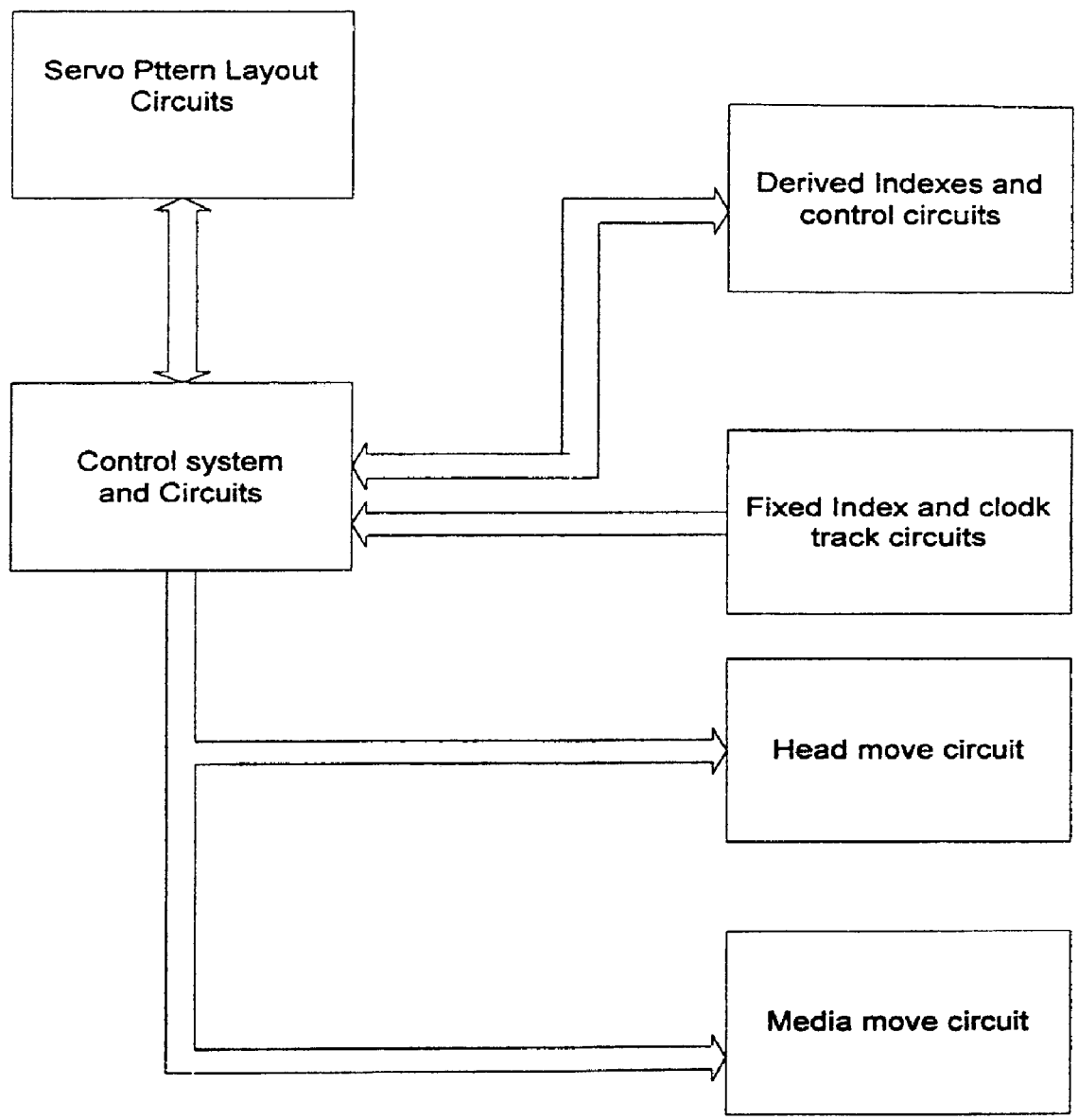
FIG. 5E is a functional block diagram to illustrate the control logic implementation of a servo writer of this invention.

According to the functional block diagram of FIG. 5E and FIGS. 1F and 1G, a magnetic or optical servo writer is disclosed in this invention. The magnetic or optical servo writer includes a magnetic or optical pickup head for rotationally moving over and writing servo data in a magnetic or optical flat data-storage medium. The magnetic or optical servo writer further includes a clock head for providing clock signals to the clock head and to write clock signals in the magnetic or optical clock disk. The magnetic or optical servo writer further includes a control circuit for controlling the magnetic or optical pickup head for writing the servo data on the magnetic or optical flat data-storage medium. The magnetic or optical servo writer further includes a servo pattern layout circuit for controlling the magnetic or optical pickup head for writing the servo data on the magnetic or optical flat data-storage medium with predefined servo patterns. The magnetic or optical servo writer further includes a derived index control circuit for deriving indices from a fixed index provided on the magnetic or optical flat data-storage medium. The magnetic or optical servo writer further includes a fixed index and clock track circuit for providing a fix index and a clock signal for controlling the magnetic or optical pickup head for writing the servo data on the magnetic or optical flat data-storage medium. The magnetic or optical servo writer further includes a head move circuit for controlling a movement of the magnetic or optical pickup head for writing the servo data on the magnetic or optical flat data-storage medium. The magnetic or optical servo writer further includes a medium movement circuit for controlling a linear movement of the magnetic or optical flat data-storage medium for writing the servo data on the magnetic or optical flat data-storage medium.

Figure 6:
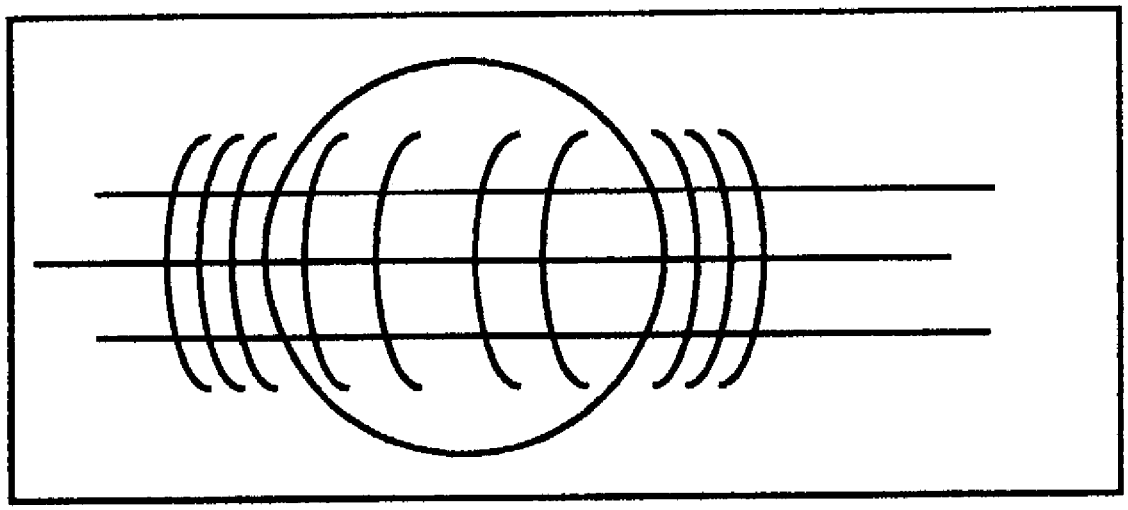
FIG. 6 the top views of the data storage card of this invention where one of the data tracks is arranged as a full circle data track among a group data arc tracks for centering the data card and data signal calibration.

Referring to FIG. 6 for a top view of the data storage card of this invention where one of the data tracks is arranged as a full circle data track for centering the data card and data signal calibration. As the pickup head moved above the data card to read the data from the full circle data track, an X-Y table that moves along horizontal directions is controlled to position the data card at a center position relative the circular movement of the pickup head. In the meantime, the data bits stored in the full circle data-track are read to determine an average amplitude of the data signals for data read from the entire full circle data track. The average amplitude of the data signal is then applied to calibrate the data detection sensitivity of the pickup head.

Figure 7A:
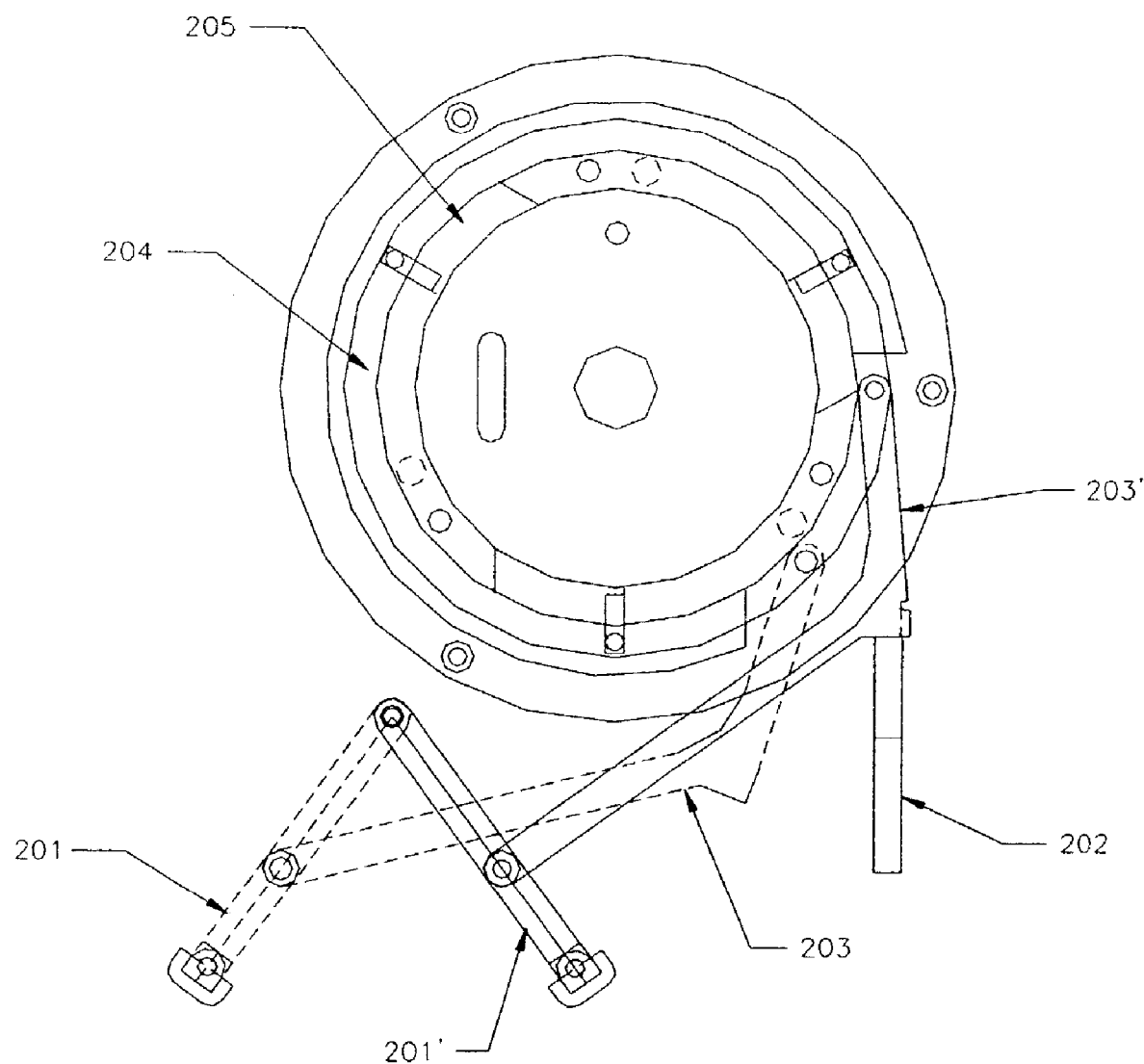
FIGS. 7A and 7B are a top and side cross sectional views of a locking mechanism for locking a handle thus prevents movement of a data card when the pickup head is moving above the data card in a reading or writing operation; The same handle arm also activating a cam mechanism engage and disengage the signal pickup head to and from the card.
Figure 7B:
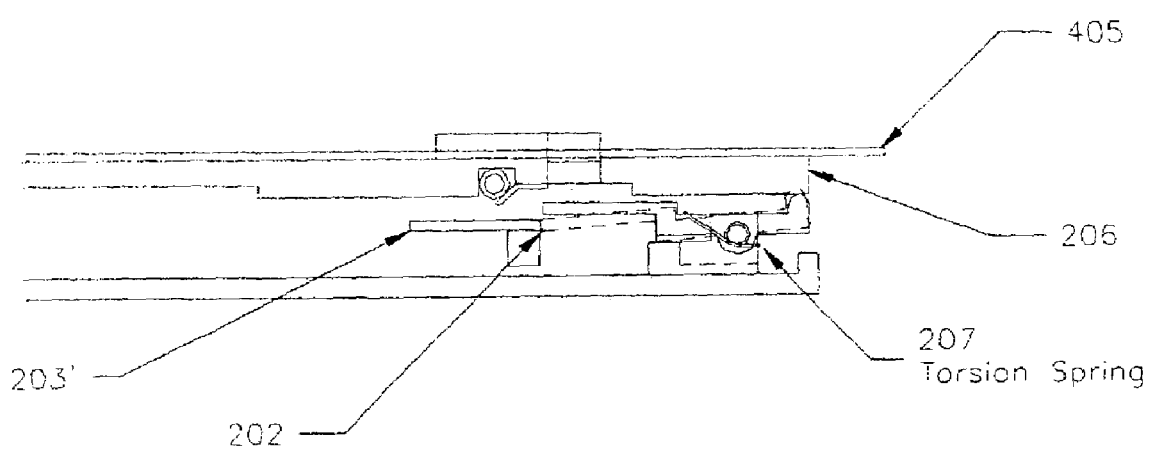

FIG. 7A shows a top view of a locking mechanism of a pickup head engagement configuration. Handle 201 can be moved by either manually or a solenoid to push a linkage 203, then to activate the pickup head loading and unloading cam pair 204 and 205. 201' and 203' show an activated state position. FIG. 7B shows a side view of lock 202 and stopper 206 that is part of X Y table slides. Once the 203' is at the activated position and the stopper 206 of X Y slider moved away from the 202, a spring 207 pushes the end of 202 up and the other end of 202 drops down to prevent 203' sliding back. Until the stopper 206 moves back and pressed the spring end of 202 down and release the 203' lock, linkage 203' stays lock to engage the pickup head in an engaged position. The details of the cam functions to engage and disengage the pickup head to a card are clearly shown in FIGS. 7A and 7B.

Figure 8A:
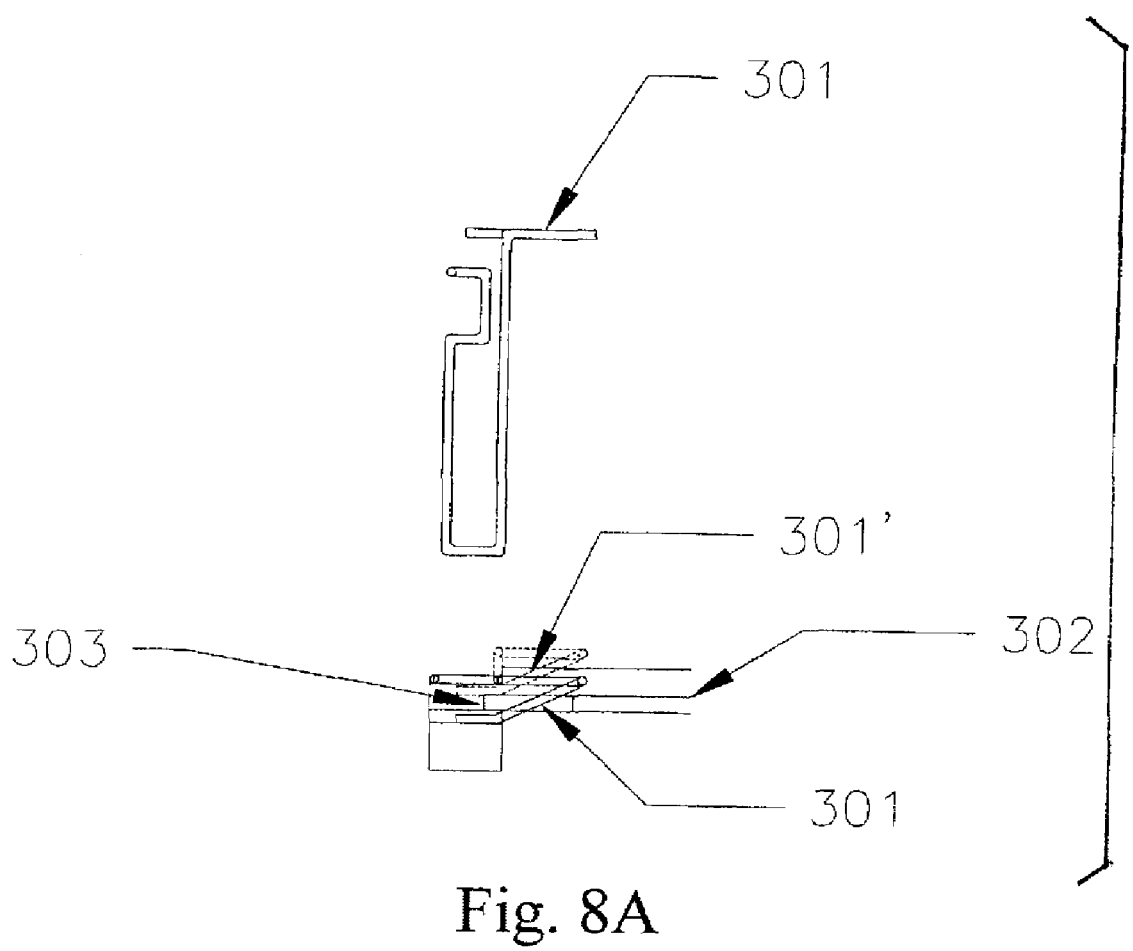
FIG. 8A is a side cross sectional view of spring lock to prevent the insertion of card in wrong direction and FIG. 8B is a card configuration that can use such lock spring configuration.
Figure 8B:
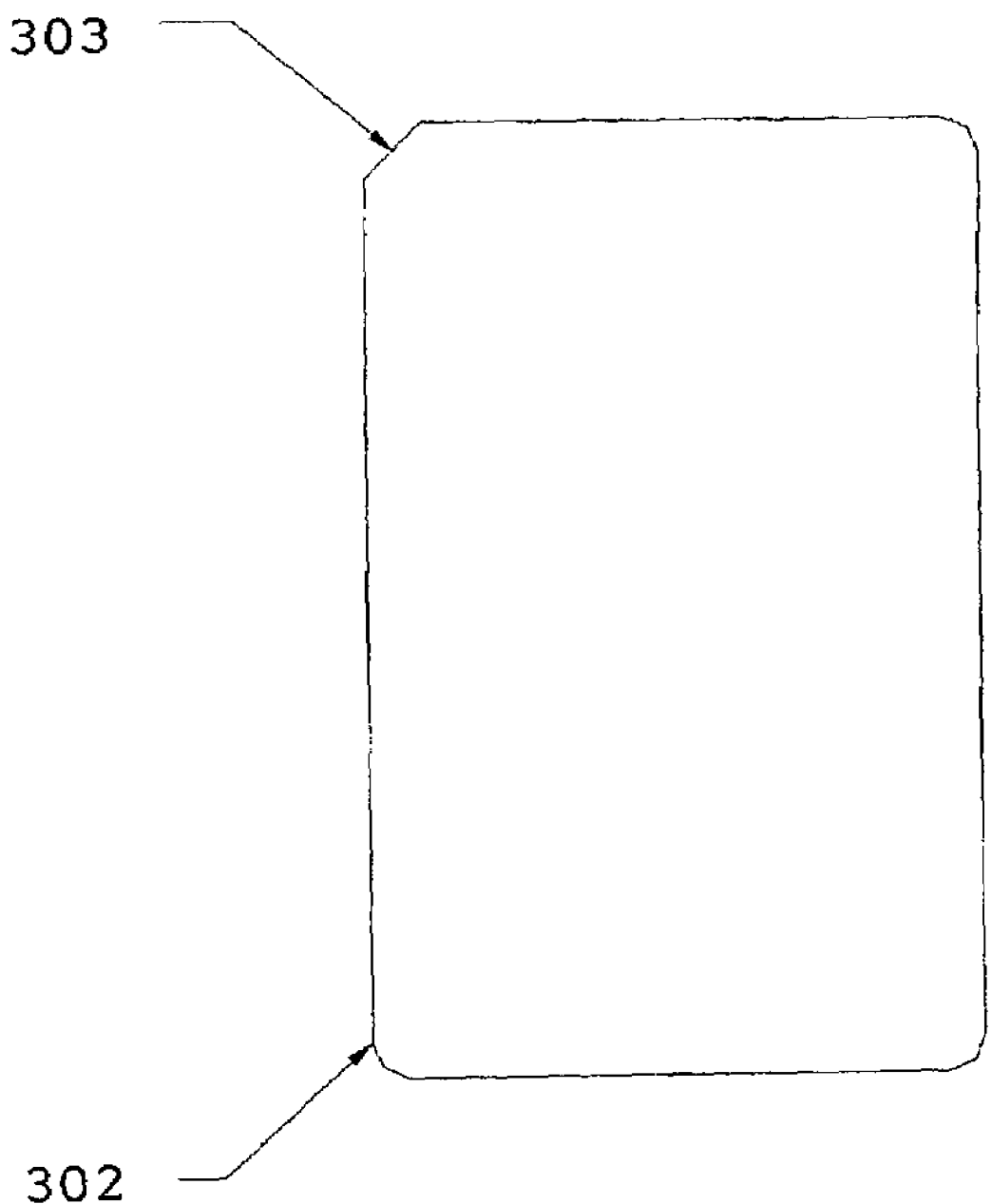

FIG. 8A is a cross section view of a card insertion lock spring 301 and card 302 with one corner cut 303. FIG. 8B shows top view of a card 302 with its one corner diagonal cut 303. When the card 302 is inserted to the device, the corner 303 pushed the spring 301 up to 301' position and the card can be inserted continuously to its final location. It the wrong side of the card is inserted that has no such corner cut, the card edge can not push the 301 upwards and the spring 301 prevents the continue insertion of card. This data card reader of this invention prevents the insertion of card 302 with wrong edge in or an upside down side direction.

Figure 9A:
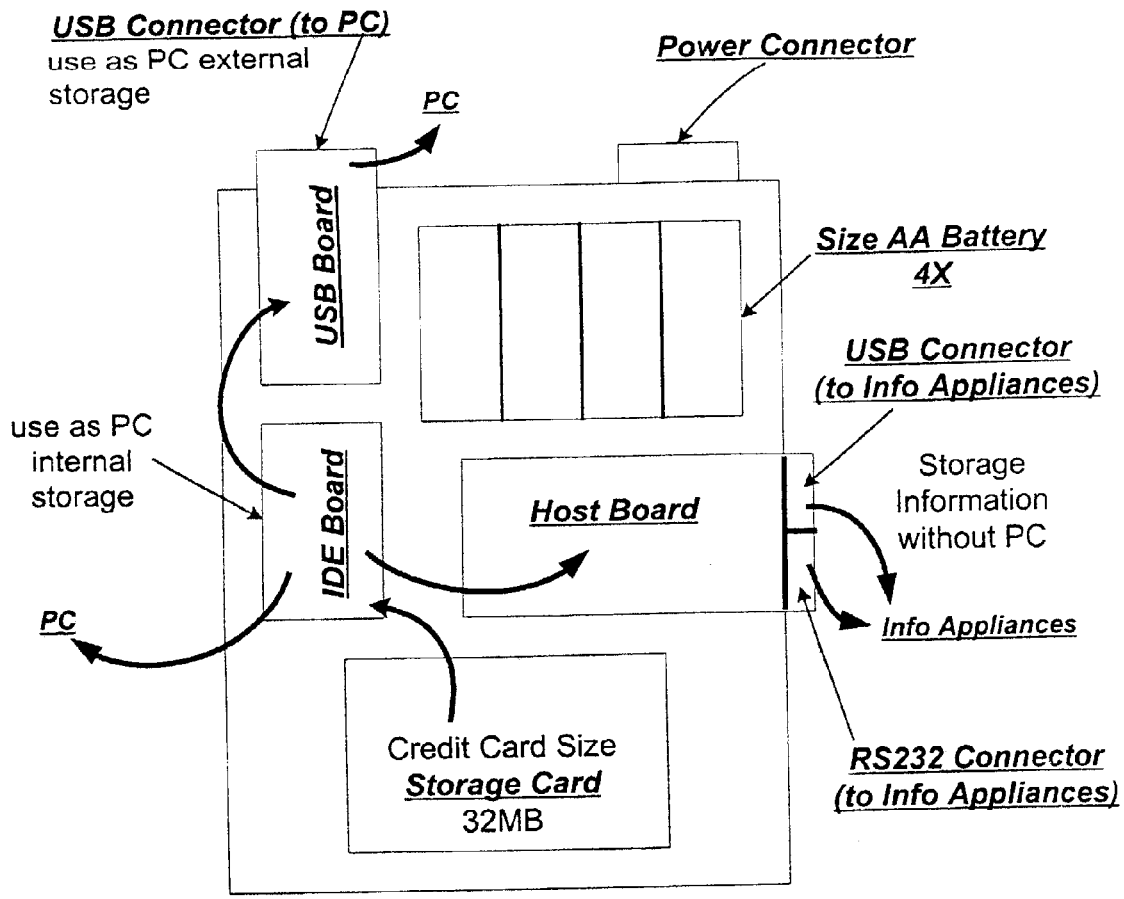
FIG. 9A is a functional block diagram of a card reader/writer system of this invention.
Figure 9B:
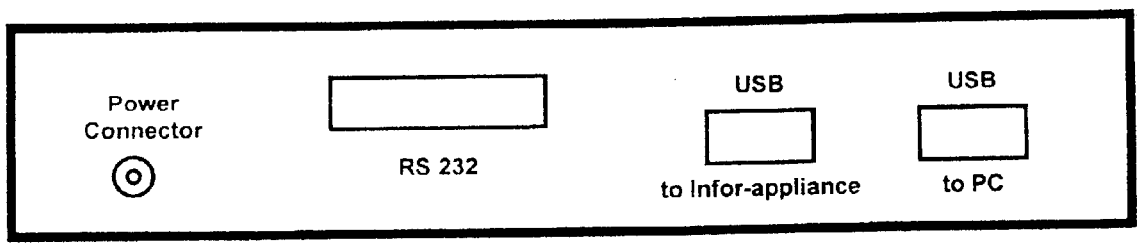
FIG. 9B shows the backside panel of a care reader/writer provided with different interfaces for parallel, serial, and universal system (USB) connection.

FIG. 9A is functional block diagram of a data card reader/writer of this invention. The data card reader/writer includes a host board provided with a reader/writer processor to control the operation and data transfer functions. Attached to the host board are an USB connector, or a 1394 connector, and an RS232 serial connector to connect to various information appliances such as digital video camera, music player, etc. The data card reader/writer further includes an IDE board and a USB or 1394 board to provide an IDE interface and a USB or 1394 interface to operate with a personal computer (PC) or as a stand-alone host. The data card reader/writer has an option to operate with batteries or AC power through a connection of a power connector. FIG. 9B is a side view of a back panel for the data card reader/writer that includes a power connector to plug into an AC power. The data card reader/writer further includes RS232 and two USB connectors for connecting to information appliances and personal computer.

Figure 10A:
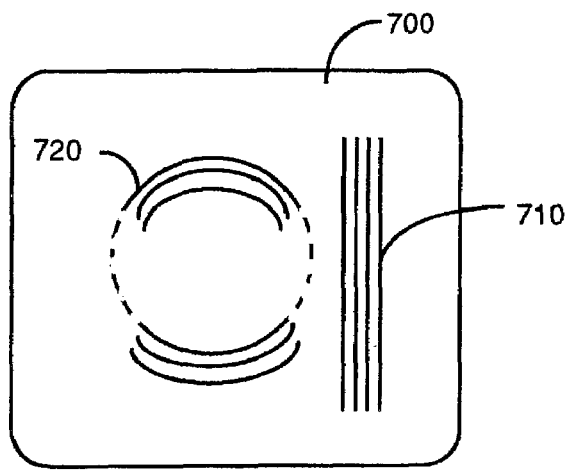
FIGS. 10A to 10D are top views for showing the data storage card of this invention where the data tracks can be configured as linear data strips and also in arc-segments and as circular data track of different shapes, sizes, tacing different directions; and distributed on one side or both sides of the data strips.
Figure 10B:
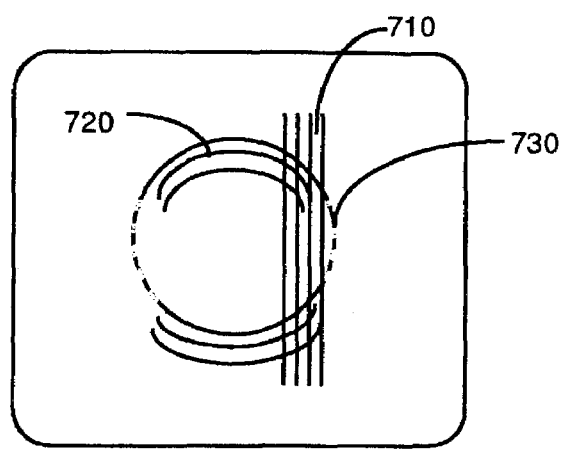
Figure 10C:
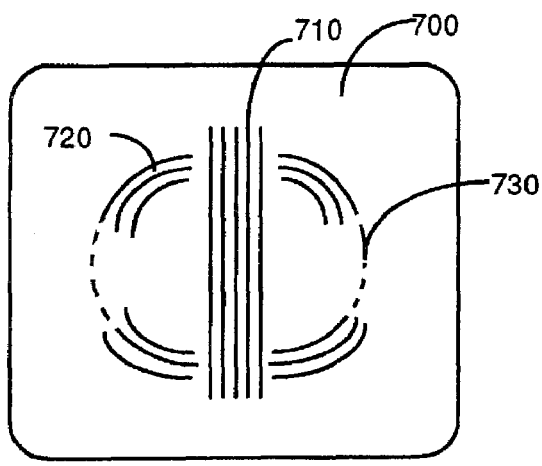

FIG. 10A to 10C are top views of show a data storage card 700 formed with data storage tracks configured both as linear data strips 710 and data arc segments 720 or circular data tracks (not shown for the sake of clarity and simplicity). Specifically, the linear data strips 710 in FIGS. 10A to 10D are compatible and can be written and read by conventional credit card or ID card writing and reading devices. In the meantime the data stored in the data arc segments 720 or circular data tracks, are accessed by the card-accessing device disclosed in this invention. The dotted lines 730 show the rotational trajectories of the rotational pickup head for reading or writing data on the data card. In a preferred embodiment, the data strips 710 and the data arc segments or the circular data tracks can be a magnetic or optical data tracks and operable with a magnetic or optical data accessing device respectively. In other preferred embodiments, the linear data track may be a magnetic strip accessible by conventional magnetic data strip writing and reading devices and the arc data segments or circular data tracks can be optical data tracks operable with optical data access devices.

Figure 10D:
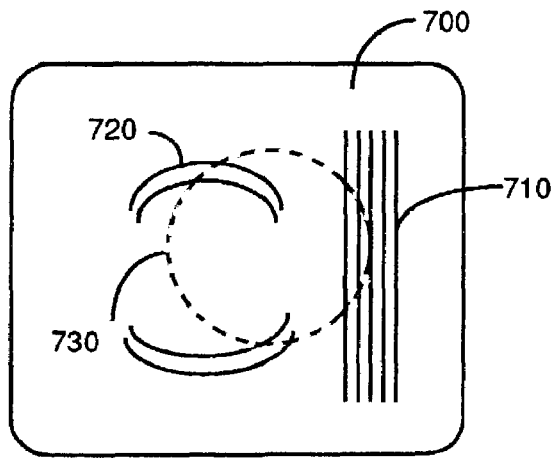

In FIG. 10A, the rotation of the pickup head read or write data on the data card 700 covers only the area of the data arc segments 720 and does not extend to the areas disposed with linear data strips 710. The linear data strips 710 are written or read by conventional data card devices, e.g., a credit card reader. In FIG. 10B, the rotational pickup head of this invention as shown by the dotted curved-line 730 also covers the linear data strips 710. Even the pickup head sweeps across the linear region, controller is provided with an option to ensure that the data in the linear track region is either protected as needed or can also be read or written by the rotational pickup head depending on the predefined functions as required for the data card and the data access devices. The data card device with a rotational pickup head can also employed to write and read the data in the linear data strips 710. In FIG. 10C, the linear data strips 710 are disposed in the middle of the data card 700 and the data arc segments 720 are disposed on both sides of the linear data strips 710. Again, a rotational pickup head as described above is applicable to access data on both types of data storage tracks. In FIG. 10D, the X-Y table of a data card device is provided to move the rotational pickup head to access data on the linear data strips 710. Therefore, the data card and the data card access devices as now disclosed in this invention have dual functions to carry out the tasks either as a conventional card reader/writer or to read/write data on the linear tracks and also the arc segments or circular data tracks that store additional information relevant to the true owner of the data card.

Figures 1, 10E:
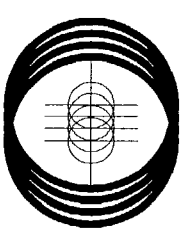
Figures 2, 10E:
Figures 3, 10E:
Figures 4, 10E:
Figures 5, 10E:
Figures 6, 10E:
Figures 7, 10E:
Figures 8, 10E:
Figures 9, 10E:
Figures 10, 10E:
Figures 10, 10E, 11:

FIGS. 10E-1 to 10E-4 and 10I-1 to 10I-3 shows the motion of a rotating head to form circular arc segments with fixed radius with moving centers. Based on this kind of motions, different kinds of data arc-segments can be formed on a data card for storing data therein as that shown in FIGS. 10E-5 to 10E-20 and 10I-4 to 10I-6. FIGS. 10F-1 to 10F-4 and 10J-1 to 10J-3 shows the data arc-segments formed with a spiral motion with continuously varying radius while rotating from a fixed or moving center. Based on this kind of spiral rotational motions, different kinds of data arc-segments can be formed on a data card for storing data therein as that shown in FIGS. 10F-5 to 10F-20 and 10J-4 to 10J-6. FIGS. 10G-1 to 10G-4 shows the formation of the data arc-segments with a "moving center rotating with constant radius" configuration to form the data arc-segments as that shown in FIGS. 10G-5 to 10G-8 and 10I-4 to 10I-6. FIGS. 10G-9 to 10G-14 show the data cards with linear data stripes disposed with data arc-segments formed by applying the methods shown in FIGS. 10G-1 to 10G-8 and 10I-1 to 10I-6. FIGS. 10H-1 to 10H-4 and 10J-1 to 10J-3 shows the formation of the data arc-segments with a spiral motion using a configuration of "Fixed or Moving center rotating with continuously varied radius" to form the data arc-segments as that shown in FIGS. 10H-5 to 10H-8 and 10J-4 to 10J-6. FIGS. 10H-9 to 10H-14 show the data cards with linear data stripes disposed with data arc-segments formed by applying the methods shown in FIGS. 10H-1 to 10H-8 and 10J-1 to 10J-6.

Each of the linear data strip and the arc data-segment or the circular data-track further includes servo data sector(s). The data stored at each servo sector indicates the data sector is in the arc track region or is in the linear track region. Device controller uses the information to ensure the arc track segment does not overlap the linear segment; the pickup head will not record the data for arc track segment to overwrite the linear track segment. At a different arrangement, as that shown in FIG. 12, a once-around index sensor is setup to provide an index indicator during the rotation of the pickup head. Device control divides the index-to-index time to a number of sector segment time such as 72 sectors. The data access device uses the index as a reference to count the predefined sector count to separate the arc track region and the linear track region. FIG. 11A shows the index detector and index pulse circuits. An integrated circuit device with a model number LM393 is employed to set the index sensor detection threshold and other integrated circuit D Flip-Flop devices are employed to shape the index pulse time with the clock divider, e.g., another integrated circuit eight bits counter. FIGS. 11B and 11C show the index dividing and the sector generating circuits. A set of eight bits loadable counter divides the index-to-index time to selected interval and stores the count with a sixteen bits data buffer. A set of sixteen bits counter count the clock between each pre-sector and compare with the stored index divided counter. Once they match and the sector signal is generated as pre sector. The index, sector, and pre-sector feed back to the divider to compensate speed variations. A sector pulse regulator formed by two OR gates and three D Flip Flops ensures that circuits do not generate multiple sector signal at index time; only one sector signal is required.

Figures 10, 10E, 11, 12:
Figures 10, 10E, 11, 12, 13:
Figures 10, 10E, 11, 12, 13, 14:
Figures 10, 10E, 11, 12, 13, 14, 15:
Figures 10, 10E, 11, 12, 13, 14, 15, 16:
Figures 10, 10E, 11, 12, 13, 14, 15, 16, 17:
Figures 10, 10E, 11, 12, 13, 14, 15, 16, 17, 18:
Figures 10, 10E, 11, 12, 13, 14, 15, 16, 17, 18, 19:
Figures 10, 10E, 11, 12, 13, 14, 15, 16, 17, 18, 19, 20:
Figures 1, 10H:
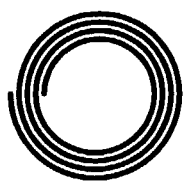
Figures 2, 10H:
Figures 3, 10H:
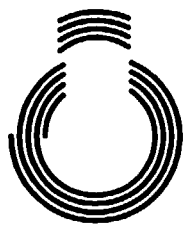
Figures 4, 10H:
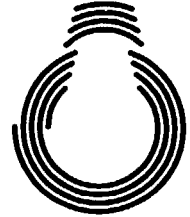
Figures 5, 10H:
Figures 6, 10H:
Figures 7, 10H:
Figures 8, 10H:
Figures 9, 10H:
Figures 10, 10H:
Figures 10, 10H, 11:
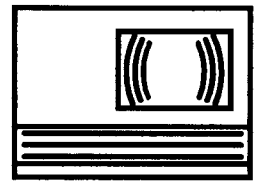
Figures 10, 10H, 11, 12:
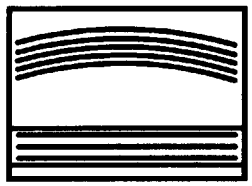
FIG. 12 is a data card provided with a magnetic strip compatible with conventional credit card verification system and an embedded data storage strip provided plurality of data arc segments of this invention.
Figures 10, 10H, 11, 12, 13:
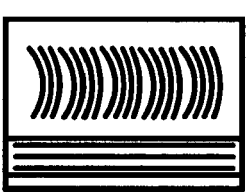
Figures 10, 10H, 11, 12, 13, 14:
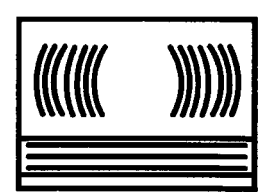
Figures 1, 10I:
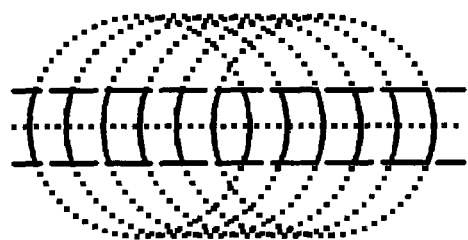
Figures 4, 10I:
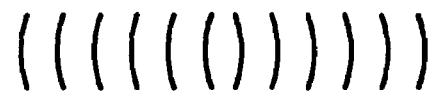
Figures 2, 10I:
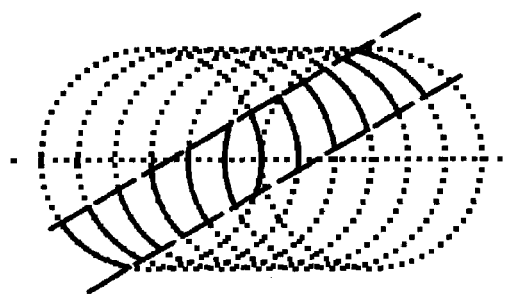
Figures 5, 10I:
Figures 3, 10I:
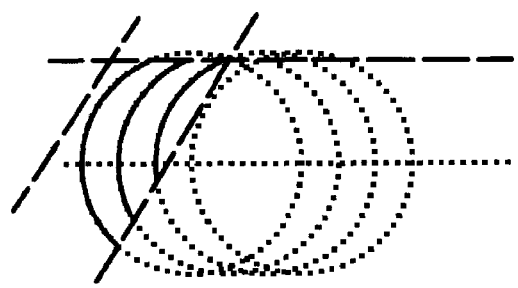
Figures 6, 10I:
Figures 1, 10J:
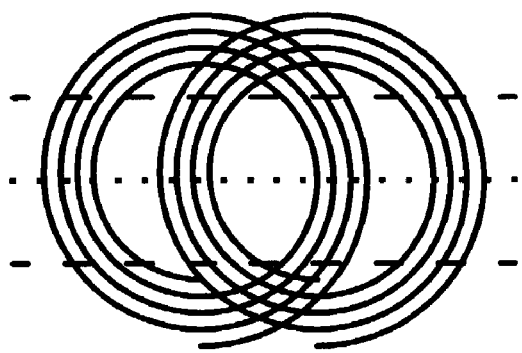
Figures 4, 10J:
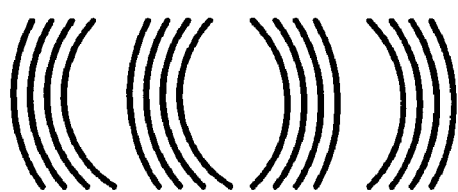
Figures 2, 10J:
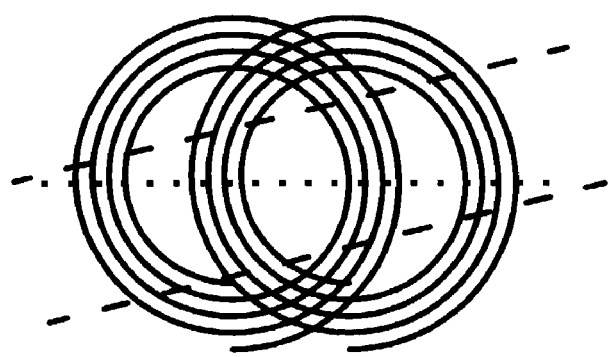
Figures 5, 10J:
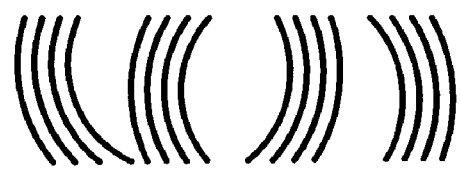
Figures 3, 10J:
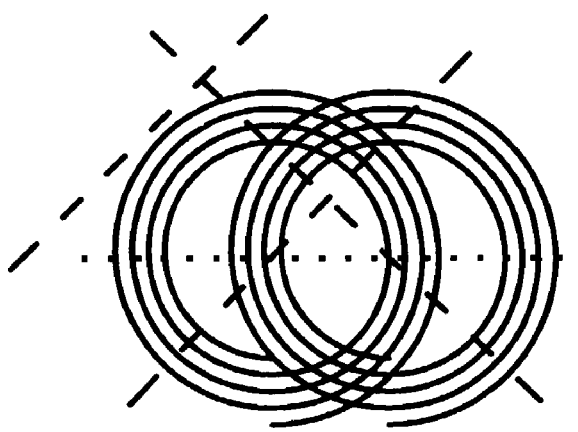
Figures 6, 10J:
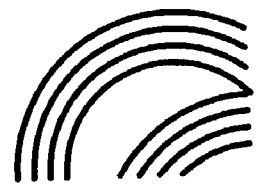
Figure 11A:
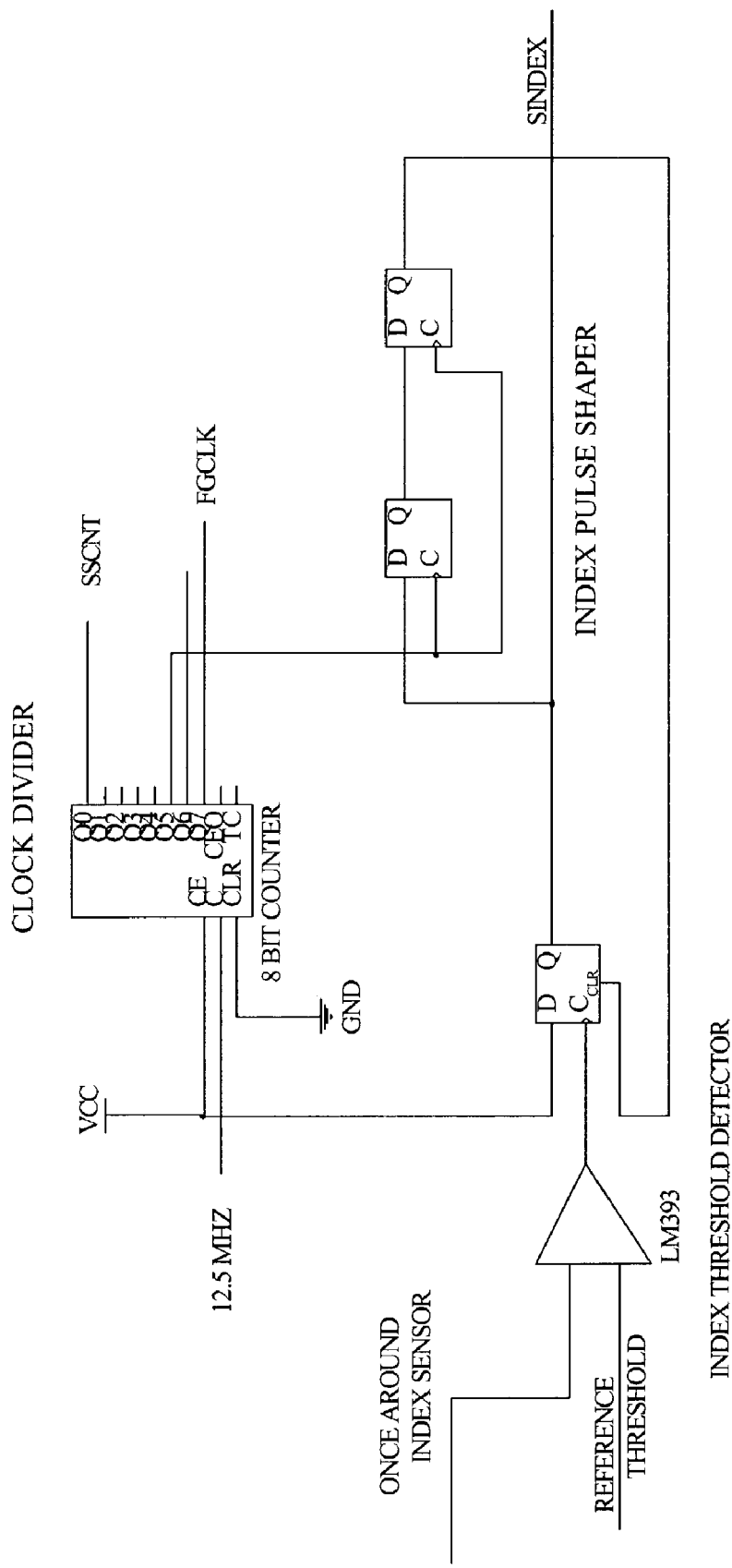
FIGS. 11A to 11C are one of means used to separate the arc data track region and the linear track region.
Figure 11B:
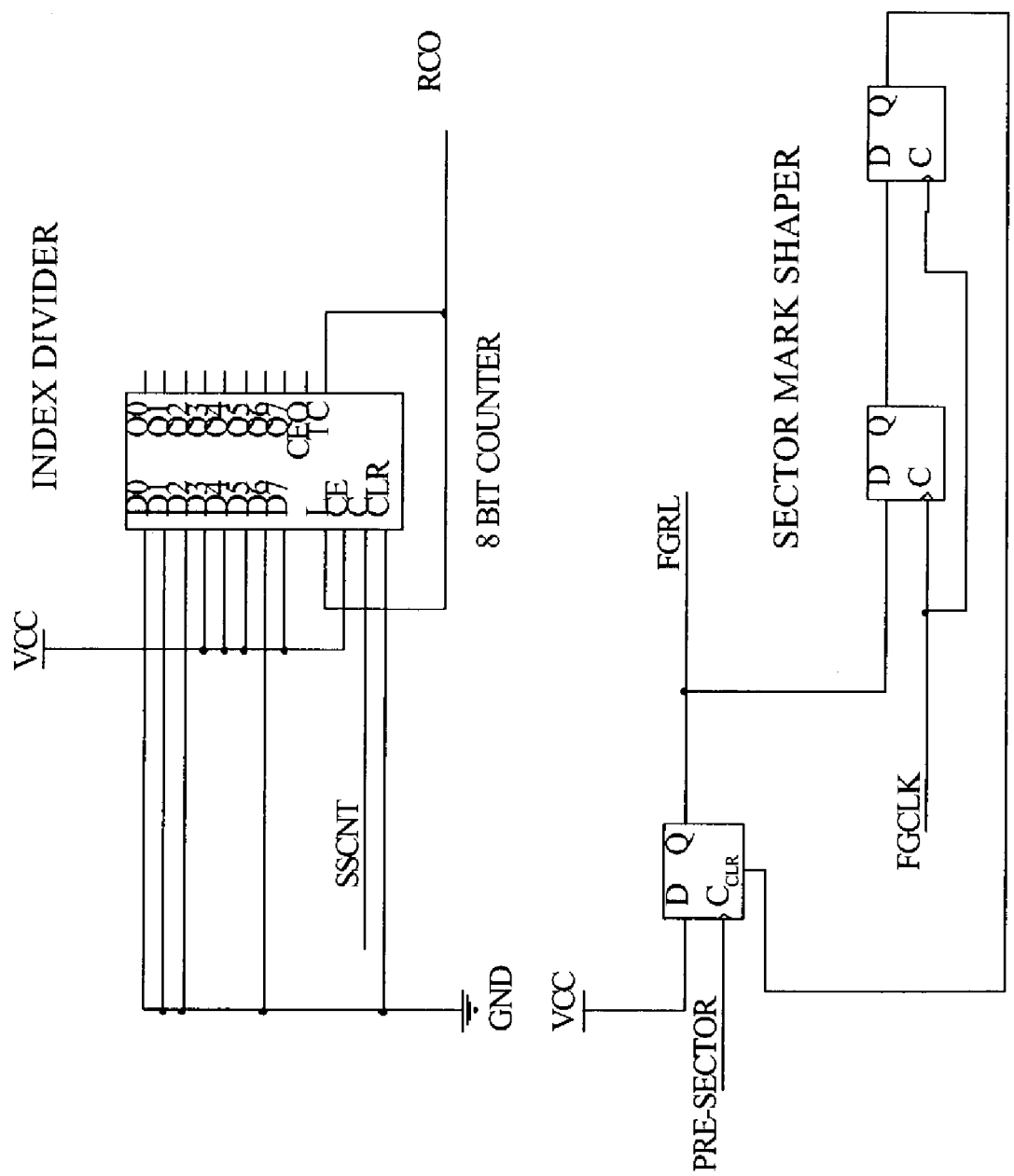
Figure 11C:
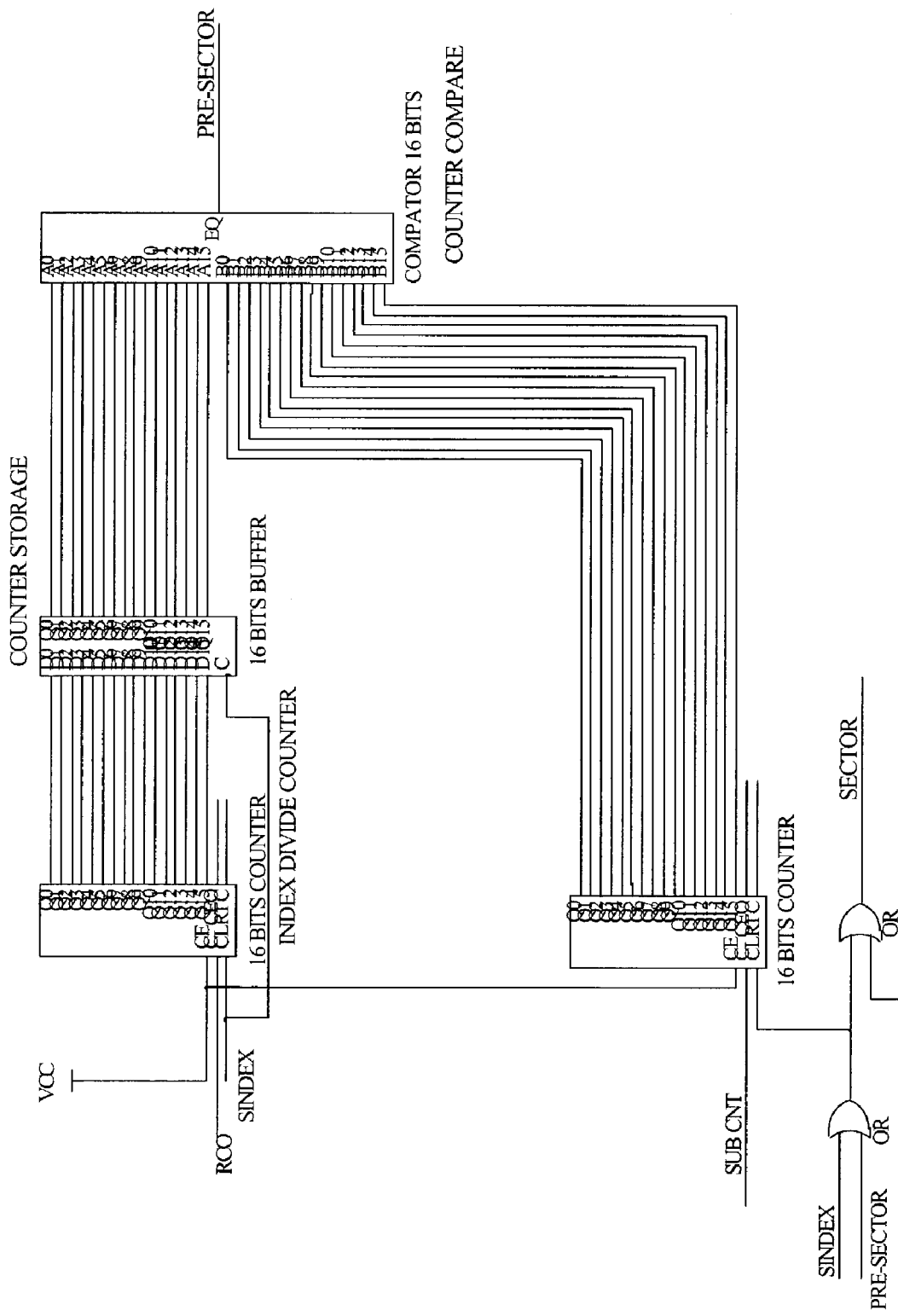
Figure 12:
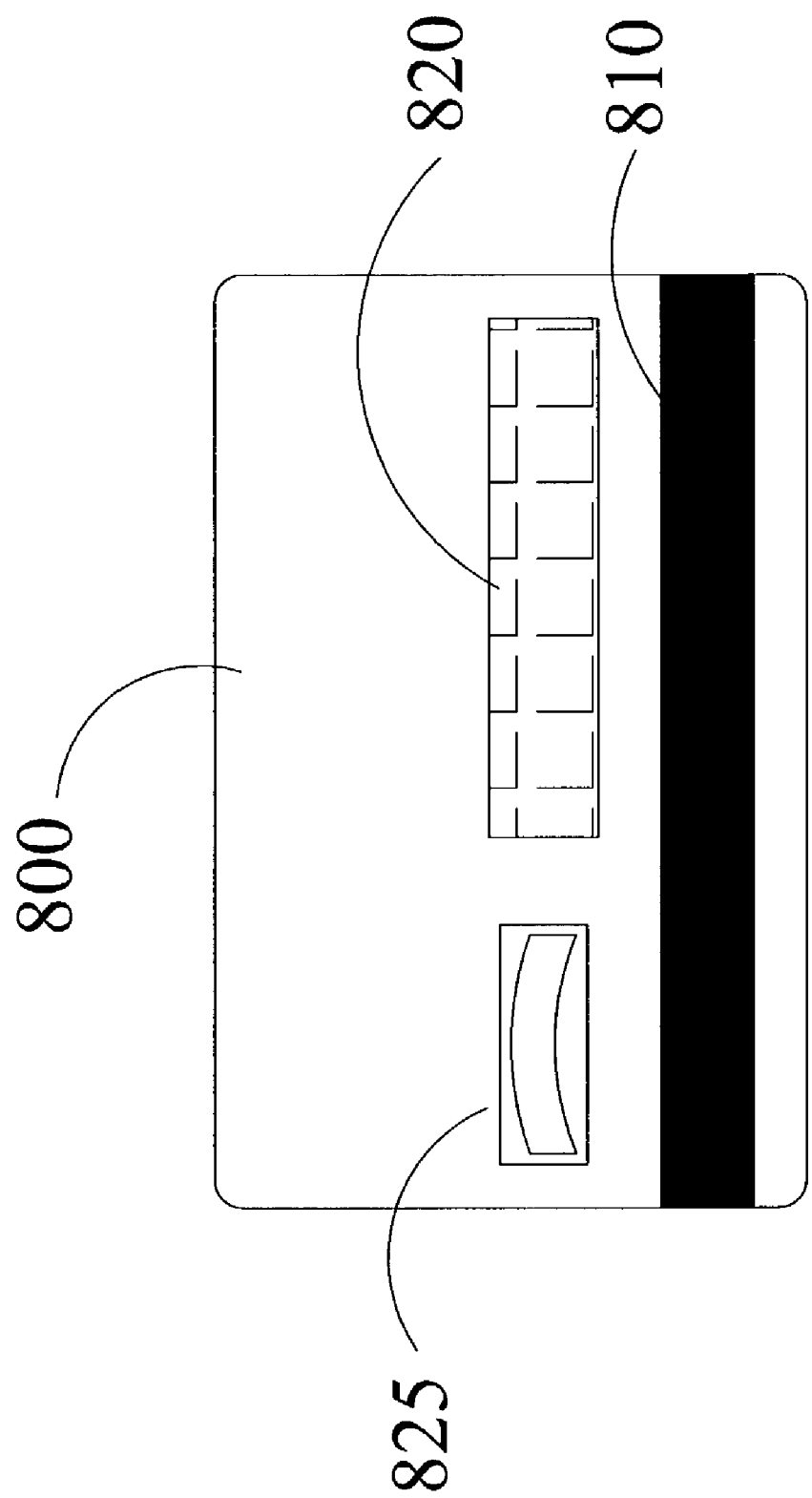

FIG. 12 shows a data card 800 that has substantially a same size as a standard credit card or identification card, e.g. a Driver's License, which can be conveniently carried in a standard wallet. Just like a regular credit card or Driver's License, the data card 800 has a magnetic strip 810 to store credit card or ID information that can be conveniently readout and transmitted by current credit card or debit card verification readers available in many stores, ATM machines, Gas stations, Banks, Membership Club or Driver's License reader carried by a police driving a highway patrol car. The data card 800 further includes a paper strip 820 to allow for user signature. A data storage strip 825 of this invention that can be either adhered on the data card or implanted in the card 800 is disposed next to the paper strip 820. The data storage chip has a width about 10 millimeters (mm) and length about 30 mm such that the data storage strip 825 may be conveniently placed in different places on the data card depending on the existing requirements for the credit cards or the ID cards. The size of the data storage strip 825 may vary depending on the requirement of the storage capacity of the application. The data storage strip 825 includes data arc segments that may be employed to store cardholder's biometric information such as picture, fingerprints, etc. The data arc segments may be of different shapes and sizes as that shown in FIGS. 10A to 10H. A preferable embodiment is to form the data arc segments as optical data arc segments for an optical card reader of this invention to read and write the data on the data arc segments.

According to FIG. 12, this invention discloses a data-storage card that includes a data storage strip 825 having at least one arc-segment wherein each arc-segment constituting a data-storage track. The data card further includes a linear data storage means 810 for storing data therein. In a preferred embodiment, each of the data-storage tracks in the data storage strip 825 further includes circular arc-segments of fixed radius. In another preferred embodiment, each of the data-storage tracks in the data storage strip 825 further includes a spiral arc-segment of varying radius. In another preferred embodiment, each of the data-storage tracks in the data storage strip 825 further includes semicircular arc-segments.

Therefore, the present invention discloses a data storage-card drive system with a pickup head moving above the data-storage card in rotational movement. The data read-write functions are enabled for arc-segments and over a linear data track as part of the rotational movement guided by servo data written to servo sectors on the data arc with proper offsets. Also, the data tracks are arranged both as linear data track, e.g., a linear magnetic or optical strip and as plurality of parallel arcs, e.g., half-circles. In one preferred embodiment, it has at least one special full circle data track for conveniently determining a central axis of the data card and for obtaining a measurement of average amplitude such that the above mentioned difficulties and limitations encountered in a regular data card can be overcome. Specifically, a pickup head driven by a motor, e.g., a brushless motor, rotates over the data-storage card with the rotation axis perpendicular to the card surface. The motor is mounted on a carriage for dynamically engage and disengage signal pickup head to and from the card. An X-Y table is provided to move and position the card on the center relative to the rotation of the pickup head and provides any required data track following motions.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A data-storage card comprising: a linear data storage strip for storing data therein; first and second discrete arc-segments each having a discrete segment beginning and end point, each discrete arc-segment constituting a discrete and open data storage track, said first and second discrete arc-segments further comprising two cutoff circular arc-segments as two cutoff, substantially concentric circular arc-segments, extending over two different radial angles, wherein said first and second discrete arc-segments are each disposed on a same surface of the data-storage card as the linear data storage strip, and the first and second discrete arc-segments are each disposed on a same side of said linear data storage strip.

2. The data-storage card of claim 1 wherein:
said first discrete arc-segment constituting substantially a cutoff circular arc-segment extending over a radial angle less than ninety degrees.

3. The data-storage card of claim 1 wherein:
said first discrete arc-segment constituting substantially a cutoff circular arc-segment extending over a radial angle less than one-hundred and eighty degrees.

4. The data-storage card of claim 1 wherein:
said first discrete arc-segment constituting substantially a cutoff spiral arc-segment formed as a discrete and open spiral data storage track formed with a fixed center rotating with continuously varying radius.

5. The data-storage card of claim 1 wherein:
said first and second discrete arc segments having different arc-segment lengths.

6. The data-storage card of claim 1 wherein:
said first discrete arc-segment constituting substantially a discrete cutoff spiral arc segment.

7. The data-storage card of claim 1 wherein:
said linear data storage strip disposed at a distance away and opposite said first discrete arc-segment on said data-storage card.

8. The data-storage card of claim 1 wherein:
said linear data storage strip disposed at a distance away and between said first and second discrete arc segments.

9. The data-storage card of claim 1 wherein:
said linear data storage strip disposed at a distance away and between said first and second discrete arc segments wherein said first discrete arc-segment constituting substantially a discrete spiral arc segment on said data-storage card.

10. The data-storage card of claim 1 wherein:
said first and second discrete arc segments constituting a two discrete and open optical data storage tracks.

11. A data-storage card comprising: first and second discrete arc-segments each having a discrete segment beginning and end point, each discrete arc-segment constituting a discrete and open data storage track; a linear data storage strip for storing data therein, said linear data storage strip disposed on a middle portion of said data-storage card between said first and second discrete arc-segments disposed on opposing sides of said linear data strip, wherein said first and second discrete arc-segments are each disposed on a same surface of said data-storage card as the linear data storage strip.

12. The data-storage card of claim 1 wherein:
said data-storage card comprising an optical data-storage card and said linear data storage strip further comprising an optical linear data track.

13. The data-storage card of claim 1 wherein:
said first and second discrete arc-segments constituting two discrete and open optical data storage tracks and said linear data storage strip comprising a magnetic linear data track.

14. The data-storage card of claim 1 wherein:
said linear data storage strip constituting a magnetic data storage strip on said data-storage card.

15. The data-storage card of claim 1 wherein:
said first and second discrete arc-segments constituting two discrete and open magnetic data storage tracks and said linear data storage strip comprising an optical linear data track.

16. The data-storage card of claim 1 wherein:
said first and second discrete arc-segments further storing servo control data for determining a beginning and an end of said discrete arc-segments.

17. The data-storage card of claim 1 wherein:
said first and second discrete arc segments further storing servo-control data at a substantially same relative position on each of said discrete arc segments.

18. The data-storage card of claim 1 wherein:
said first and second discrete arc-segments further storing servo-control data near either a beginning or an end point of said first and second discrete arc segments.

19. A data-storage card comprising: a linear data storage strip for storing data therein; first and second discrete arc-segments each having a discrete segment beginning and end point, each discrete arc-segment constituting a discrete and open data storage track, wherein said data-storage card is a credit card having a first surface displaying credit card information and a second surface with said discrete arc-segments and said linear data storage strip disposed thereon, wherein the first and second discrete arc-segments constitute substantially two concentric, discrete, circular arc-segments disposed together at a distance away from and on a same side of said linear data storage strip of said data-storage card.

20. The data-storage card of claim 19 wherein:
said linear data storage strip on said second surface of said credit card is readable by a magnetic stripe credit card reader.

21. The data-storage card of claim 19 wherein:
said discrete and open data track and said linear data storage strip disposed on said second surface of said credit card storing information for preventing a credit card fraud.

22. A data-storage card comprising: a linear data storage strip for storing data therein; first and second discrete arc-segments each having a discrete segment beginning and end point, each discrete arc-segment constituting a discrete and open data storage track, said data-storage card is an identification (ID) card having a first surface displaying ID card information and a second surface with said discrete arc-segments and said linear data storage strip disposed thereon, wherein the linear data storage strip is disposed in between the first and second discrete arc-segments, wherein said first and second discrete arc-segments are disposed on a same side of the linear data storage strip.

23. The data-storage card of claim 22 wherein:
said linear data storage strip on said second surface of said ID card is readable by a magnetic stripe ID reader.

24. The data-storage card of claim 22 wherein:
said discrete and open data track and said linear data storage strip disposed on said second surface of said ID card storing information for preventing an identification fraud.

25. A data-storage card comprising: a magnetic linear data storage strip for storing data therein; first and second discrete arc-segments each having a discrete segment beginning and segment end point, each discrete arc-segment constituting a discrete and open optical data-storage track, said data-storage card is an identification (ID) card having a first surface displaying ID card information and a second surface with said discrete and open optical data tracks and linear data storage strip disposed thereon, the first and second discrete arc-segments are disposed on a same side as the linear data storage strip.

26. The data-storage card of claim 25 wherein:
said discrete and open optical data-storage tracks constituting substantially a cutoff discrete and open circular arc-segment of fixed radius.

27. The data-storage card of claim 25 wherein:
said discrete and open optical data-storage tracks constituting substantially a cutoff discrete and open spiral arc-segment of a fixed radius.

28. The data-storage card of claim 25 wherein:
said discrete and open optical data-storage tracks further constituting a discrete and open semicircular arc-segments.

* * * * *